United States Patent
Arnold et al.

[19]

[11] Patent Number: 6,160,213
[45] Date of Patent: Dec. 12, 2000

[54] ELECTRONIC MUSIC INSTRUMENT SYSTEM WITH MUSICAL KEYBOARD

[75] Inventors: Rob C. Arnold, Des Moines; Warren W. Westlund, II, Ames, both of Iowa; David Van Koevering, Hermitage, Tenn.; Robert D. Lawson, Des Moines, Iowa; Lance E. Lyda, Hurst, Tex.; Kenneth R. Noyce, West Des Moines, Iowa; Robert Phillips, Northbrook, Ill.; John M. Pursey; Gary L. Snethen, both of Des Moines, Iowa

[73] Assignee: Van Koevering Company, Des Moines, Iowa

[21] Appl. No.: 09/321,920

[22] Filed: May 28, 1999

Related U.S. Application Data

[63] Continuation of application No. 08/879,678, Jun. 23, 1997, Pat. No. 5,908,997, which is a continuation of application No. 60/020,601, Jun. 24, 1996, and a continuation of application No. 60/021,522, Jul. 11, 1996.

[51] Int. Cl.⁷ .............................. G10H 1/18; G10H 7/00
[52] U.S. Cl. .............................. 84/615; 84/610; 84/634; 84/744 R
[58] Field of Search ...................... 84/609–610, 626–634, 84/649–650, 662–666, 477 R, 478, DIG. 6, 615, 616, 618

[56] References Cited

U.S. PATENT DOCUMENTS

| | | | |
|---|---|---|---|
| 4,624,171 | 11/1986 | Yuzawa et al. | 84/609 |
| 4,881,440 | 11/1989 | Kakizaki | 84/609 |
| 4,960,031 | 10/1990 | Farrand | 84/609 |
| 5,027,689 | 7/1991 | Fujimori | 84/622 |
| 5,046,004 | 9/1991 | Lui | 84/462 |
| 5,054,359 | 10/1991 | Hikawa | 84/645 |
| 5,085,116 | 2/1992 | Nakata et al. | 84/609 |
| 5,092,216 | 3/1992 | Wadhams | 84/602 |
| 5,138,925 | 8/1992 | Koguchi et al. | 84/609 |
| 5,142,961 | 9/1992 | Paroutaud | 84/726 |
| 5,146,833 | 9/1992 | Lui | 84/462 |
| 5,174,759 | 12/1992 | Preston et al. | 434/317 |
| 5,220,117 | 6/1993 | Yamada et al. | 84/600 |
| 5,225,618 | 7/1993 | Wadhams | 84/602 |
| 5,252,775 | 10/1993 | Urano | 84/645 |
| 5,262,580 | 11/1993 | Tamaka | 84/602 |
| 5,270,475 | 12/1993 | Weiss et al. | 84/603 |
| 5,274,779 | 12/1993 | Stewart et al. | 345/302 |
| 5,286,908 | 2/1994 | Jungleib | 84/603 |
| 5,296,641 | 3/1994 | Steizel | 84/602 |
| 5,298,675 | 3/1994 | Nishimoto et al. | 84/622 |
| 5,300,723 | 4/1994 | Ito | 84/601 |
| 5,300,725 | 4/1994 | Manabe | 84/609 |
| 5,331,111 | 7/1994 | O'Connell | 84/602 |
| 5,355,762 | 10/1994 | Tabata | 84/609 |
| 5,389,729 | 2/1995 | Hiramatsu | 84/601 |
| 5,391,827 | 2/1995 | Koyama | 84/477 R |
| 5,393,926 | 2/1995 | Johnson | 84/610 |

(List continued on next page.)

*Primary Examiner*—Robert E. Nappi
*Assistant Examiner*—Marlon Fletcher
*Attorney, Agent, or Firm*—Quarles & Brady LLP

[57] ABSTRACT

An electronic music instrument system, comprising: an electronic music instrument, having selectable groups of reproducible sounds and individually selectable reproducible sounds; a signal generator for energizing an audio amplifier responsive to different digital audio sources, including the groups of sounds and the individual sounds a graphical user interface for displaying at least one control graphic representing controllable parameters of the audio signals generated by the generator; and, a controller responsive to operation of the control graphic for adjusting the controllable parameters of the generator and for selectively coupling different ones of the sources to the generator. The graphical user interface can comprise: a video display; and, a touch-responsive overlay. The controllable parameters can include multiple instrument sound selection and sound layer assignment, controlled responsive to operation of the at least one control graphic. The at least one control graphic can be displayed on a single screen.

31 Claims, 27 Drawing Sheets

U.S. PATENT DOCUMENTS

| | | | |
|---|---|---|---|
| 5,398,278 | 3/1995 | Brotz | 379/101.01 |
| 5,410,100 | 4/1995 | Kim | 84/645 |
| 5,410,941 | 5/1995 | Hotta et al. | 84/601 |
| 5,416,526 | 5/1995 | Yamamoto | 348/484 |
| 5,499,921 | 3/1996 | Sone | 434/307 A |
| 5,512,707 | 4/1996 | Ohshima | 84/658 |
| 5,541,354 | 7/1996 | Farrett et al. | 84/603 |
| 5,559,301 | 9/1996 | Bryan, Jr. et al. | 84/653 |
| 5,646,362 | 7/1997 | Koyama et al. | 84/615 |
| 5,665,927 | 9/1997 | Taki et al. | 84/609 |
| 5,728,960 | 3/1998 | Sitick | 84/477 R |
| 5,908,997 | 6/1999 | Arnold et al. | 84/615 |
| 5,949,012 | 9/1999 | Ishii | 84/615 |

ELECTRONIC MUSIC INSTRUMENT SYSTEM WITH MUSICAL KEYBOARD

This application is a Continuation of U.S. application Ser. No. 08/879,678, filed Jun. 23, 1997, now U.S. Pat. No. 5,908,997, which claims the benefit of U.S. Provisional Application Ser. No. 60/020,601, filed Jun. 24, 1996, and U.S. Provisional Application Ser. No. 60/021,522, filed Jul. 11, 1996, which benefits are also claimed by this application.

FIELD OF THE INVENTION

The invention relates to electronic musical instruments. The invention relates more particularly to electronic musical instruments having a computer-based control system.

BACKGROUND OF THE INVENTION

Known musical keyboard systems utilizing computer systems for computer-assisted production of musical output typically have complicated control systems and user controls, such as numerous buttons, knobs, switches and sliders, making them impractical for novice users and even for proficient musicians during performances.

Early developments in computer-assisted musical instruments have utilized MIDI (Musical Instrument Digital Interface) protocol to process musical instrument inputs for the emulation of musical sound through playback of digitally stored voice samples. Numerous devices have been developed utilizing MIDI and associated technology to provide electronic keyboards as well as digital and digital/acoustic pianos.

Resulting systems have interfaced with the user in one of two extremes. The systems either provide little or no interaction between the user and the underlying computer system, as in the case of consumer digital pianos, commonly used for player piano and recording functions, or are primarily intended for use by recording and performing professionals, utilizing complicated interfaces involving numerous buttons, knobs, switches and sliders. Other systems utilize complicated visual interfaces, making the features largely inaccessible to novice or consumer users and unmanageable for "real time" adjustment during performances by professional musicians.

Moreover, most systems incorporating computer-based management of a musical instrument have primarily focused on the operation of the musical instrument and have not incorporated the musical instrument and its sound production into a larger music information management environment that is readily accessible to both novices and performing musicians through a consolidated, rapidly accessible graphical user interface. Existing systems also do not provide a vehicle to launch multimedia applications from a consolidated graphical user interface for use in a musical instrument and multimedia music information environment.

SUMMARY OF THE INVENTION

It is accordingly an object of the invention to provide an electronic musical instrument system having a consolidated, user-friendly control for substantially all functions and parameters of music information management and operation.

It is another object of the invention to provide an electronic musical instrument system that facilitates rapid, real-time control adjustment of musical parameters and functions to quickly alter the sound of the system by the user, even during performance on the musical instrument.

It is a further object of the invention to provide an electronic musical instrument system that is capable of interactive control and response with the musical instrument and music information sources for teaching and training.

It is a still further object of the invention to provide an electronic musical instrument system that can obtain digital and analog information from a variety of sources and present the information to the user in full motion pictures using MPEG-1 standard video and multi-color graphics or use the information to effect automatic playing of the musical instrument by the system itself.

It is yet another object of the invention to provide a musical instrument and multiple music information source environment for launching and running music related applications through a readily accessible graphical user interface.

These and other objects of the invention are achieved by a computer-managed electronic musical instrument system including a musical instrument, such as musical keyboard, interactively managed by a computer control system that is operated by the user primarily through a graphical user interface, preferably embodied in a touch controlled video display.

The musical instrument system can further include components to obtain digital information from a variety of sources, including hard drive, floppy disk, optical disk, and on-line services and databases through a modem. Thus, the system can function to automatically play the musical keyboard, present audio-visual information such as sheet music with performance examples, karaoke, educational and other audiovisual information and presentations including motion pictures, and produce audio and visual output of digital music, text or other information downloaded from on-line sources through the modem.

According to an aspect of the invention, the system is arranged so that all these functions are substantially controlled through a graphical user interface, preferably manipulated by input through a touch screen overlay. Thus, a complete music information environment is created in conjunction with a versatile musical keyboard to enhance the performance and the utility of the musical keyboard, controlled through a unified, simple, user-friendly interface that can be readily mastered by a novice and yet facilitates rapid mid-performance adjustments and control by a seasoned musician.

An electronic music instrument system, in accordance with an inventive arrangement, comprises: an electronic music instrument, having selectable groups of reproducible sounds and individually selectable reproducible sounds within the groups of sounds; an audio signal generator for energizing an audio amplifier responsive to different ones of a plurality of digital audio sources, including the groups of sounds and the individual sounds of the electronic music instrument; a graphical user interface for displaying at least one control graphic representing controllable parameters of the audio signals generated by the generator; and, control means responsive to operation of the control graphic for adjusting the controllable parameters of the generator and for selectively coupling different ones of the sources to the generator.

The graphical user interface can comprise: a video display; and, a touch-responsive overlay.

In a presently preferred embodiment, the controllable parameters include multiple instrument sound selection and sound layer assignment, controlled responsive to operation of the at least one control graphic; and, the at least one control graphic is displayed on a single screen of the graphical user interface.

BRIEF DESCRIPTION OF THE DRAWINGS

A more thorough understanding of the invention can be gained from a reading of the following detailed description of various embodiments of the invention in conjunction with the accompanying drawings, in which.

DETAILED DESCRIPTION OF EMBODIMENTS OF THE INVENTION

The invention is directed to an electronic musical instrument utilizing a computer-based music information management system to process and produce sound and other music information from a plurality of sources. Generally, the invention provides the convergence and integration of various subsystems to arrive at an interactive musical instrument system. The system can thus derive music and other information from a variety of information sources to enhance the performance and uses of an electronic musical keyboard. The system preferably creates a user-friendly environment, established by a consolidated, touch screen control interface.

The preferred embodiments of the invention provide a multimedia platform, including components for presenting full motion digital video, animation, multi-colors, high resolution graphics, and digital audio. The software drivers for the musical instrument system preferably present motion picture through the MPEG-1 standard of 30 frames per second to provide full motion digital video.

The musical instrument system preferably includes a storage subsystem comprising 720 megabytes through an optical disk, 500 megabytes or more in a hard drive, and 1.44 megabytes on floppy disk. The optical disk and associated drivers enable use of compact discs in a variety of formats, including CD-DA and CD-ROM.

The musical instrument system preferably utilizes MIDI (Musical Instrument Digital Interface) standard protocol for communications between the musical keyboard and a MIDI sound generator, as well as for receipt and transmittal of music information between the various digital sources of the system.

The musical instrument system can further include a modem for exchanging information with a variety of on-line sources. Through the on-line sources and the optical disk drive, the musical instrument system can obtain information for performing a variety of functions previously available only through complicated or separate systems.

Figure 1:
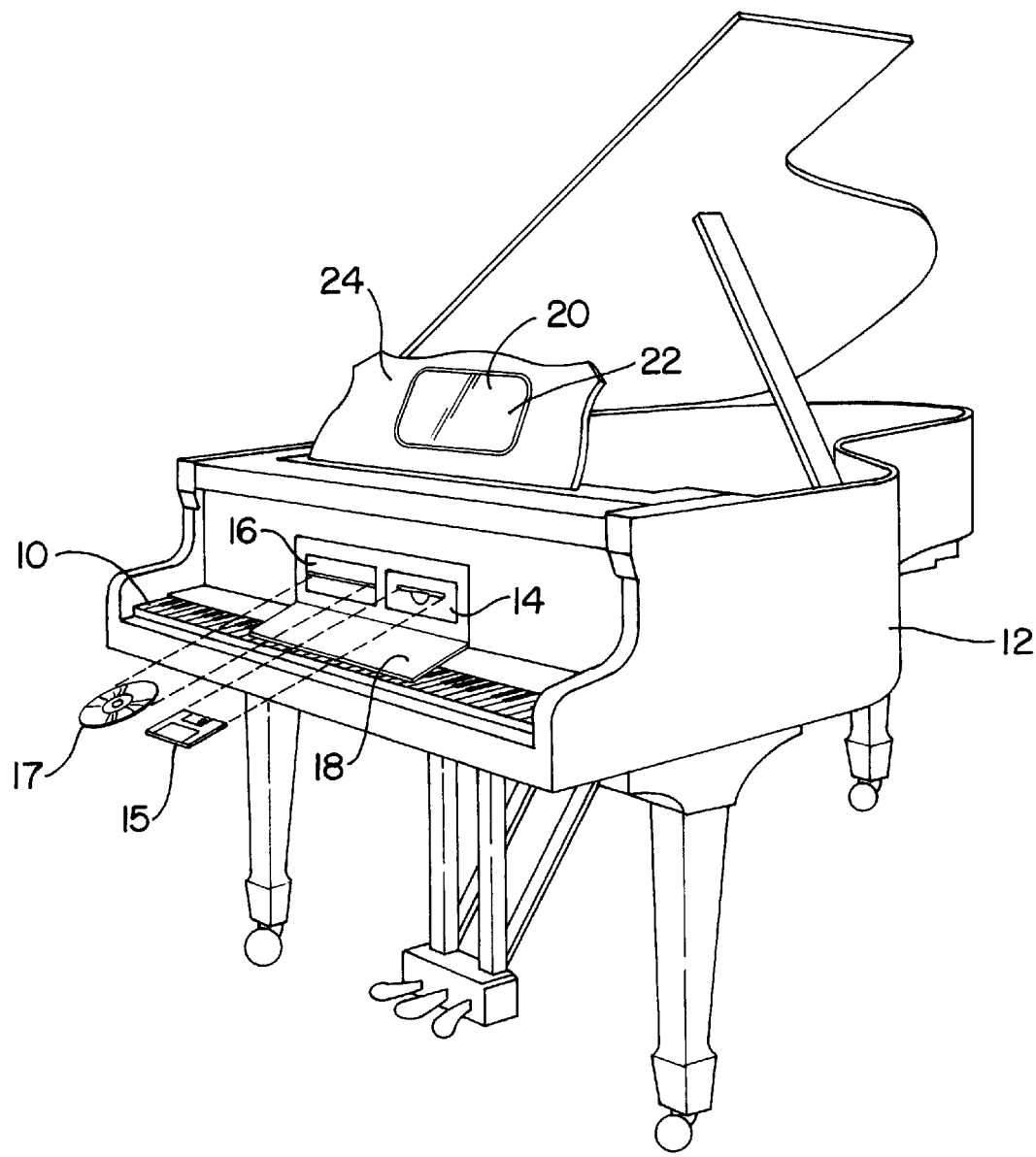
FIG. 1 is a perspective view of an embodiment of an interactive musical instrument system according to the invention.

Referring to the figures and particularly to FIG. 1, an embodiment of the musical instrument system of the invention can generally include a musical keyboard 10 encased in a grand piano housing 12. Alternative housings, including upright, console and the like, can be used. The musical keyboard 10 is preferably an 88-key, velocity-sensitive keyboard that is capable of producing electric signals suitable for scanning and conversion into MIDI data by a computer system. The system preferably includes a plurality of digital information sources, such as a drive 14 for a floppy disk 15 and a drive 16 for a compact disk 17, each being enclosed in the piano housing 12 and optionally hidden behind a cover, such as a hinged door 18.

According to an aspect of the invention, the control of the musical instrument system sound parameters and information retrieval and utilization are preferably unified in a graphical user interface presented on a video monitor, such as a flat screen display 20 that is preferably equipped with a touch control overlay 22 for detecting and processing player input through relative position of contact with the overlay 22. The flat screen display 20 is preferably positioned flush in a music stand 24 of the piano housing 12, although other mountings are possible.

Figure 3:
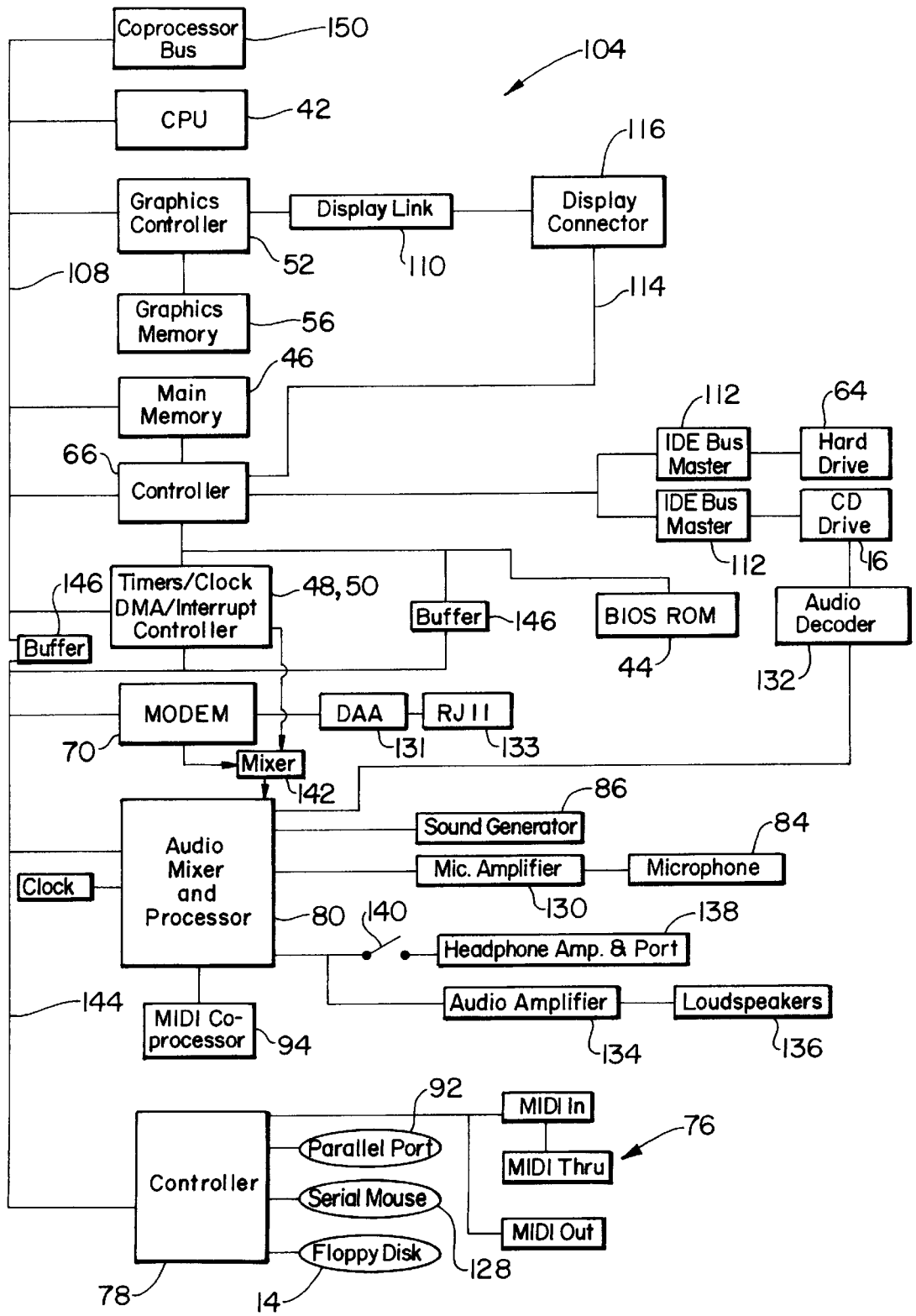
FIG. 3 is a block diagram of an exemplary information processing subsystem architecture of the MIMS depicted in FIG. 2.
Figure 4:
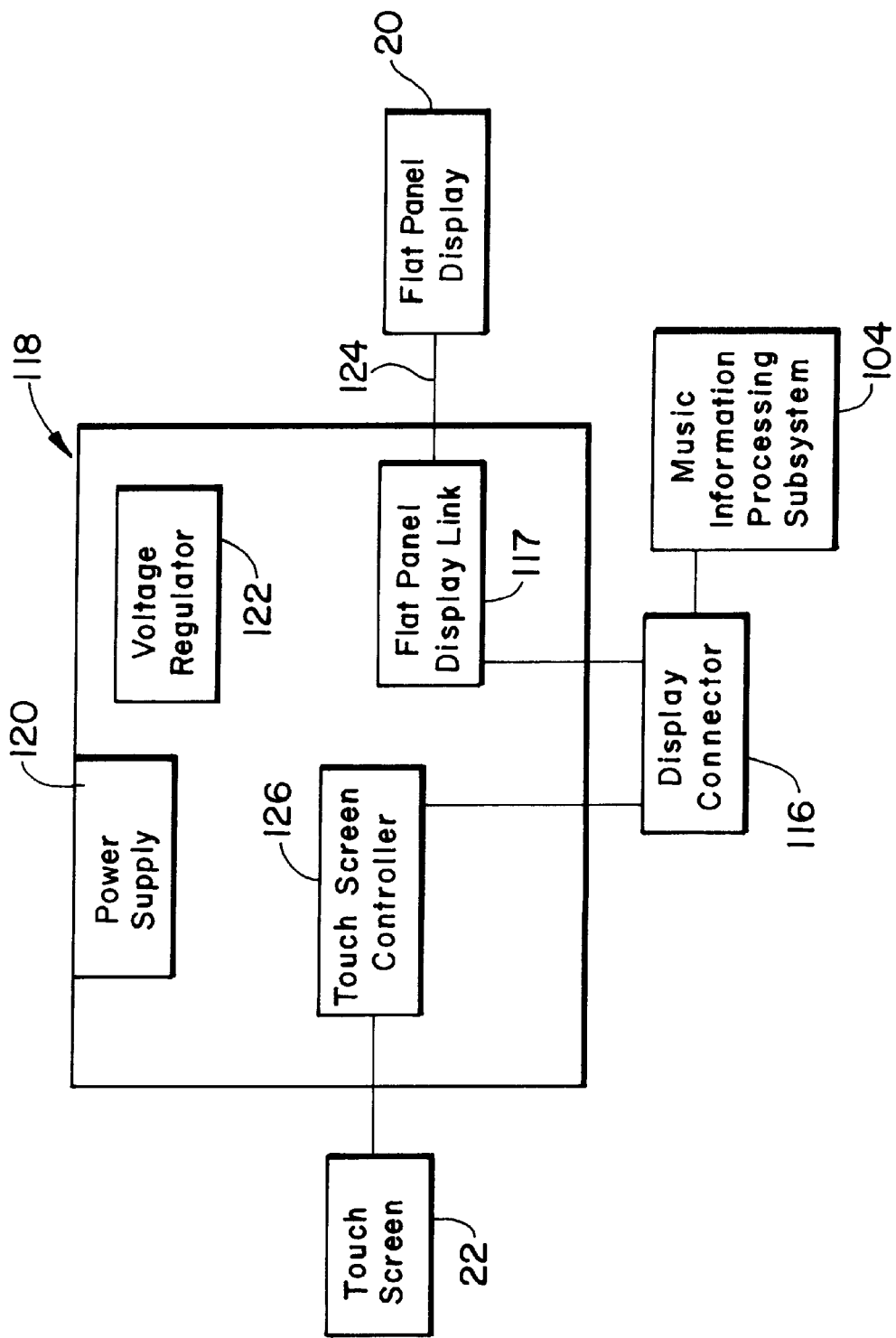
FIG. 4 is a block diagram of an exemplary conversion board for interfacing the user interface display and touch control with the MIMS.
Figure 5:
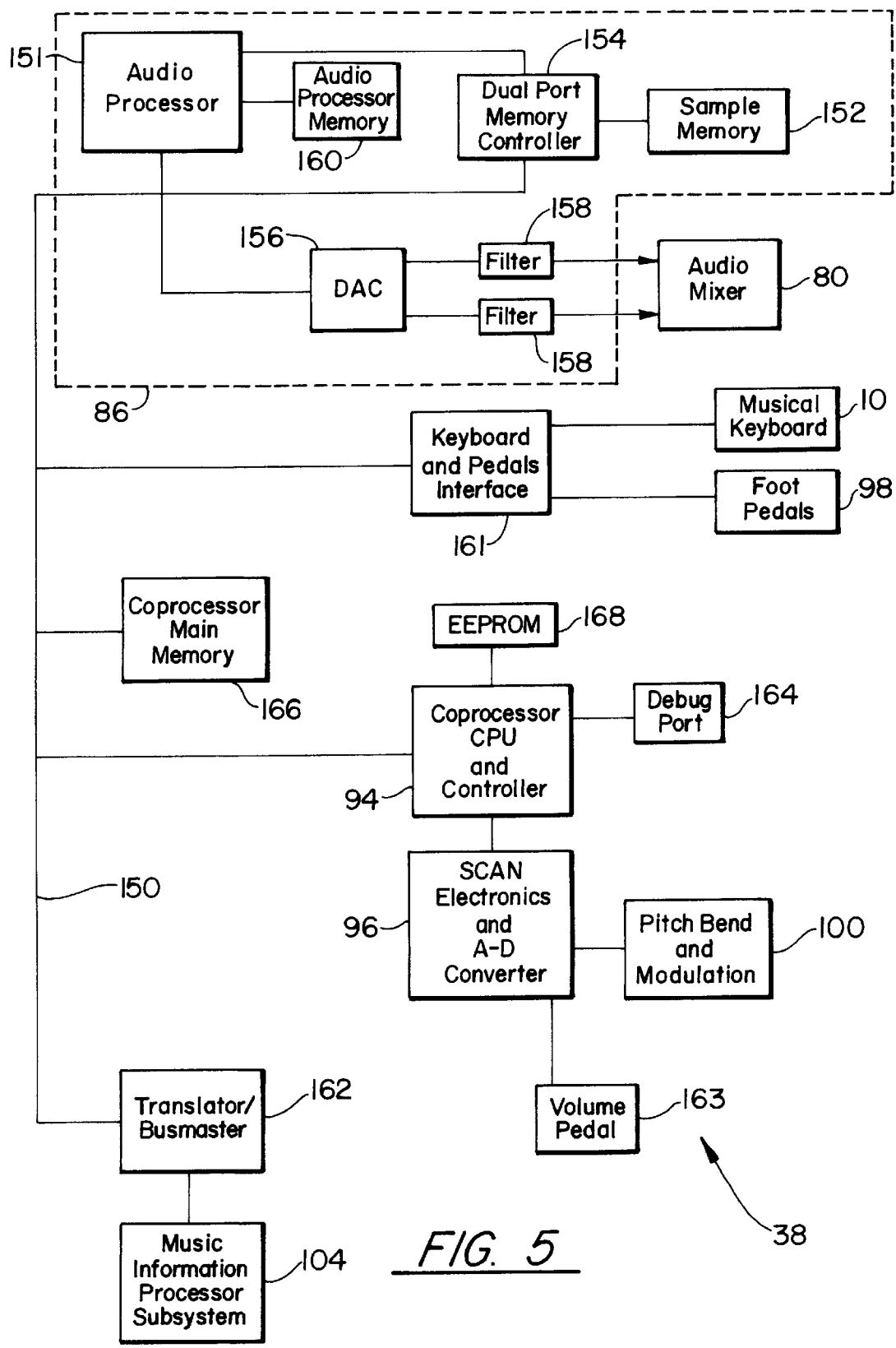
FIG. 5 is a block diagram of an exemplary MIDI sound generation subsystem architecture of the MIMS depicted in FIG. 2.

A music information management system ("MIMS" hereinafter) for coordinating the interaction between the consolidated graphical use interface, the musical keyboard and the plurality of digital information sources is preferably encased within the housing 12. An overview of an embodiment of the MIMS is set forth in FIG. 2. An exemplary design of the music information processing subsystem is illustrated in FIG. 3 and FIG. 5 with a detail of an exemplary MIDI sound generation subsystem shown in FIG. 5. An overview of a touch-sensitive LCD conversion board assembly is shown in FIG. 4. Throughout the figures, effort has been made to use the same reference numbers for the same or similar components to provide continuity among the illustrated embodiments.

Figure 2:
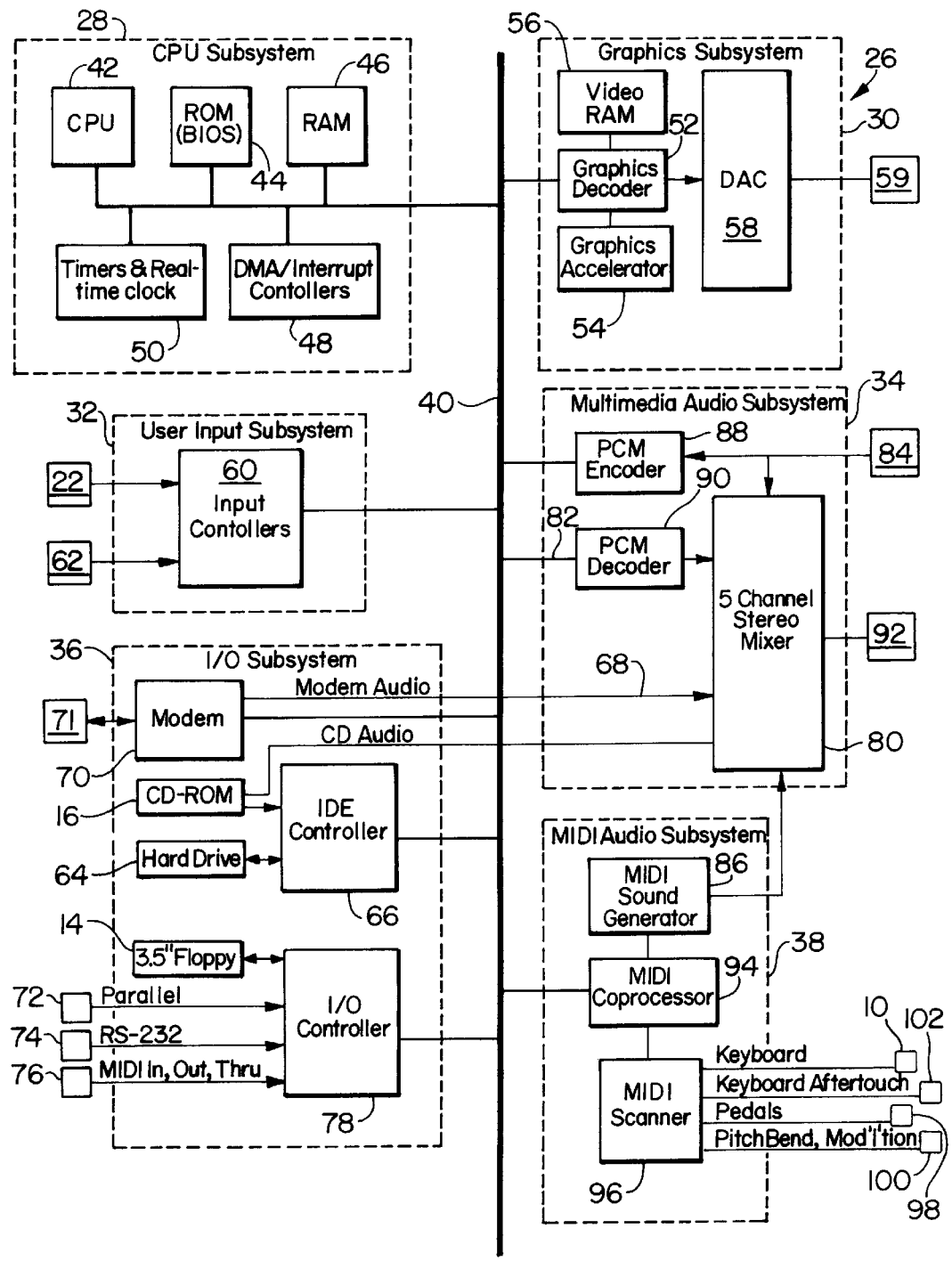
FIG. 2 is an organizational block diagram of an exemplary music information management system (MIMS) according to the invention.

Referring to FIG. 2, the MIMS 26 can generally include a CPU subsystem 28, a display subsystem 30, a user input subsystem 32, a multimedia audio subsystem 34, an input/output subsystem 36 and a MIDI audio subsystem 38. The various subsystems can be linked through a bus subsystem 40. The CPU subsystem 28 can include a primary processor 42 for the MIMS 26, as well as ROM 44 for storing BIOS instructions and RAM 46 for application execution. The CPU subsystem 28 can be supported by DMA/interrupt controllers 48 and components 50 for timers and real time clock functions.

The display subsystem 30 preferably includes a graphics decoder 52 for generating video images under command from the CPU subsystem 28. The functions of the graphics decoder 52 can be enhanced by a graphics accelerator 54 for providing improved MPEG-1 level video. The graphics decoder 52 can further be supported by dedicated video memory 56. The data generated by the graphics decoder 52 can be further processed by a digital to analog converter 58 for presentation to a display subsystem 59 including the flat display 20 (FIG. 1).

The user input subsystem 32 allows the user to navigate through the various control screens of the graphical user interface discussed more fully below. The user input subsystem 32 can provide input controllers 60 for processing user inputs through the preferred touch screen overlay 22 (FIG. 1). Alternative user inputs, such as a mouse 62, can also be interfaced with the user input subsystem 32.

According to the invention, a plurality of sources of musical digital information are provided through the input/output subsystem 36. These information sources can include the CD player 16, capable of reading data from compact discs and producing CD-DA audio output. The information sources can further include a hard drive 64 and the floppy disk drive 14. The information sources can be interfaced with the overall system through various controllers 66 with CD audio output 68 being directed to the multimedia audio subsystem 34. The input/output subsystem 36 can provide communication components including a modem 70 for the transmission and receipt, through telephone lines 71, of musical digital information and the generation of audio for direct processing by the multimedia audio subsystem 34. The communication components can further include a parallel port 72, an RS-232 serial port 74, and MIDI IN, OUT and THRU ports 76 interfaced with the system through an I/O controller 78.

The multimedia audio subsystem 34 is preferably constructed to process audio signals from a variety of digital and analog sources throughout the MIMS 26. The multimedia audio subsystem 34 can include a multiple channel stereo mixer 80 for receiving and mixing signals from the CD-DA source 68, the modem 70, PCM files on line 82, an external microphone 84 and a MIDI sound generator 86 within the MIDI audio subsystem 38.

The analog signals of the microphone 84 can be routed directly to the stereo mixer 80 or can be further converted to digital code through a PCM encoder 88 for further use, recordation or other processing by the MIMS 26. PCM files on line 82 can be converted to analog form by a PCM decoder 90 within the multimedia audio subsystem 34. The output of the audio subsystem 34 is directed to a sound output assembly 92 including, for example, an audio amplifier and one or more associated loudspeakers.

The MIDI audio subsystem 38 provides a MIDI sound module 86 for generating analog audio signals based on MIDI instructions received from various components of the MIMS 26. Instructions for the MIDI sound generator 86 are managed by a MIDI co-processor 94, which also serves to control scanning of MIDI input devices and particularly the musical keyboard 10 (FIG. 1) by a MIDI scanner 96. The MIDI scanner componentry 96 can be adapted to monitor and process input from other MIDI sources, including pedals 98, pitch bend and modulation controls 100 and aftertouch features 102 in the keyboard 10.

Control Processing Unit Subsystem

Referring to FIG. 3, the music information processing subsystem 104 of the invention preferably includes an Advanced Micro Devices 586-133 central processing unit 42, processing at 133 MHz. Alternative central processing units can be utilized but the specifications of the preferred unit are considered minimum for suitably quick performance. The music information processing subsystem 104 preferably includes components to establish multimedia capabilities. The music information processing subsystem 104 further preferably includes 8 MB of application RAM 46 and a 72 pin SIMM socket (not shown) for additional memory expansion capability.

A preferred system BIOS ROM 44 includes standard BIOS routines, such as established in Chips and Technologies BIOS SE4041, including routines for testing system hardware, a bootstrap loader to load the operating system off the hard drive 64, and a group of device drivers that service the system I/O components, such as the display 20 (FIG. 1), the hard drive 64 and floppy disk drive 14, a real-time clock, and parallel and serial ports. The BIOS preferably additionally includes routines for booting the system without displaying any diagnostic text on the display 20 (FIG. 1) or displaying any operating system boot screen. The BIOS can also preferably include conventional system debug and test routines to allow the MIDI co-processor 94 (see FIG. 5 also) to diagnose problems in the main processor portion of the system 104.

The BIOS preferably has a fixed configuration and will not rely on the CMOS RAM, but rather is preferably stored in Flash memory that can be updated without replacing the device. The BIOS can preferably be augmented to include routines to avoid error messages and other interrupting displays to the user. Some hardware test routines can be modified to ignore certain errors, such as keyboard error and CMOS RAM Checksum tests. Clock functions are preferably set via the operating system.

The music information processing subsystem 104 further includes components for timing, DMA 48 and interrupt controllers 50. These functions can be accomplished, for example, by a CS4045 from Crystal Semiconductor, but could be met by any chip(s) capable of handling the system's timers and real-time clock and optionally implementing the system's DMA and interrupt controllers.

Graphics Subsystem

The main processor CPU 42 is operatively linked through a local CPU bus 108 to a plurality of support devices, including the graphics subsystem 30 (FIG. 2). The graphics subsystem 30 provides a graphics controller 52 that preferably includes a built-in graphics accelerator and a digital to analog converter (DAC) capable of generating SVGA graphic output. A graphics processor providing preferred specifications is the 65548/65550 Flat Panel CRT GUI DAC Multimedia Engine from Chips and Technologies, but other similarly configured graphics processors can be used. The video output is preferably directed to the flat screen display 20 (FIG. 1), such as a Sharp Model No. LQ10D031 4-bit color LCD display. The graphics processor 52 preferably provides 640×480 resolution at 16-bits/pixel color and interfaces with dedicated display memory 56, which is preferably 1 megabyte (MB) of EDO high performance RAM.

The interface to the display 20 and the touch-sensitive overlay 22 (FIG. 1) is implemented through a display link 110, which can be constructed in conventional manner. The display link chip set preferably takes 20 bits of TTL parallel data from the graphics controller 52 and converts it to serial Low Voltage Differential Signaling ("LVDS") data that is 3 bits wide. This conversion occurs at seven times the dot clock rate by way of an internal phase lock loop (PLL). 20 bits of data include 6 bits red, 6 bits green, 6 bits blue, an H sync, and a V sync. One LVDS signal is also used for clocking and sync of the serial data for a total of four LVDS pairs. Referring to FIG. 4, the receiving display link 117 converts the serial LVDS data back to twenty bits parallel, plus the dot clock to connect directly into the LCD flat panel 20.

Again in FIG. 3, the graphics subsystem further preferably includes a graphics accelerator 54 (FIG. 2) capable of YUV-to-RGB conversion and image scaling for higher performance MPEG-1 video. The MPEG-1 images can be generated through known hardware and/or software systems. These functions can be provided, for example, by the 65550 chip for the graphics controller 52, the graphics accelerator 54, and the DAC 58 (FIG. 2).

I/O Subsystem

The music information processing subsystem 104 preferably includes a controller 66, such as provided by a CS4045 chip from Crystal Semiconductor, which is a multi-purpose peripheral and memory interface that can communicate via IDE bus masters 112 with the hard drive 64 and the CD-ROM drive 16. The CD-ROM drive 16 is preferably at least a quad-speed (4×) CD-ROM drive, capable of 600 KB/sec reads, and the hard drive 64 preferably has at least a 540 MB capacity.

The controller 66 can also include a CS4041 chip used to handle addressing and refresh of the main system memory 46 and addressing of the system BIOS stored in the ROM 44.

The controller 66 also preferably provides communications with the touch screen overlay 22 (FIGS. 1 and 4) as a standard input device through a bi-directional link 114 via a display connector 116, primarily to receive input signals from the touch control overlay 22 but also to direct calibrating signals and other information to the overlay 22 and its controller.

Display Subsystem

As shown in FIG. 4, the musical instrument system provides a user input means which preferably includes the touch panel or overlay 22 and an LCD conversion board 118 mounted behind the flat panel display 20 (shown schematically). The arrangement of the conversion board 118 for the display and touch screen interface can be designed in conventional manner to generate screen images pursuant to instructions from the music information processing subsystem 104 and to retrieve input signals generated by player contact with the touch screen overlay 22.

The conversion board 118 can be linked to a power supply 120 arranged to provide dimming control, DC to AC conversion and a +12V supply. A standard voltage regulator 122 for conversion to a +5V level can also be provided. The conversion board 118 can be linked to the flat panel display 20 through a conventional thirty-one conductor flat cable 124. As discussed earlier, the flat panel display link 117 converts signals received through a display connector 116 for further processing and display on the flat panel display 20.

The User Input Subsystem

A touch screen controller 126 preferably includes a Motorola 68HC05 Microprocessor, a TI TLC1543 10 bit analog to digital converter, allowing 1024 points on both the X and Y axis, and a National 93C46 EEPROM. The touch screen controller 126 controls the analog to digital conversion and the brightness of the backlight. It also provides serial communication with the main processor 42 (FIG. 3), stores and retrieves data in the EEPROM, and runs diagnostics. The touch screen controller 126 is operatively connected to the touch panel 22, which can be either 4 or 8 wire analog resistive.

Because of tolerance variations in both the touch screen 22 and the interface components, it is necessary to calibrate the controller 126. Calibration data is preferably stored in an EEPROM so that it is retained after power-down.

Referring again to FIG. 3, the input/output controller 78 preferably includes a 37C665 Super I/O chip. The chip is an integrated controller that provides interface to the preferred 3.5"1.44 MB floppy diskette drive 14, a bi-directional parallel port 92, and a serial port 128 for connecting, for example, an optional mouse input device (not shown).

The subsystem 104 can further provide the modem 70, preferably a Rockwell No. SMV144AC modem, capable of transferring data at 14400 baud, although slower modem speeds to 9600 baud can be used. The modem 70 can be used to access music information from on-line services and other remote sources for storage and processing in the MIMS. The modem 70 can also enable transmission from the system for transferring music information to other systems. The modem 70 is connected through a Data Access Arrangement (DAA) module 131, which provides electrical isolation and audio connection between the telephone line 71 (FIG. 2) and the data/modem circuits. The DAA module is designed to meet or exceed the FCC part 68 requirements allowing direct connection into the Public Switched Telephone Network (PSTN). The DAA module 131 provides ring detection and hook switch control as well as an audio path and 1500 volt isolation/800 volt surge protection. The modem 70 and DAA module 131 interface with the telephone line 71 through a standard RJ11 port 133.

Multimedia Audio Subsystem

Referring to FIGS. 2 and 3, the multimedia audio subsystem preferably includes components for receiving and mixing audio signals from a plurality of sources including the modem 70, the MIDI sound generator 86, the microphone 84 with the amplifier 130. Optionally, alarms or bells from controllers 48, 50 can also be made audible. The audio output signals are directed to an amplifier 134 and loudspeakers 136 as well as a headphone amplifier and port 138. The system preferably includes a headphone present switch 140. The system can optionally provide volume and balance controls (not shown).

The multimedia audio system preferably includes a CS4232 integrated chip which includes the stereo mixer 80, capable of combining the multiple signals into a two channels stereo output; attenuators for the input signals, a voice encoder 88 (FIG. 2) to process the microphone vocal input; and a balance control. Preferably, there are five possible audio sources in the system: CD Audio, MIDI synthesis, microphone audio, PCM audio and modem audio.

When playing a CD-DA disc in the CD drive 16, the built-in Red book, 16-bit audio decoder 132 on the CD-ROM drive 16, capable of playing CD-DA audio at 44.1 kHz, decodes the CD audio to an analog audio output which connects to the CS4232 audio mixer and processor 80 through an analog input for mixing, processing and output to the audio amplifier 134 and loudspeakers 136 or the headphone amplifier and port 138.

The audio mixer 80 can also receive PCM audio input. PCM audio, also referred to as wave audio, is a most common form of audio used in CD-ROM applications. A PCM or "WAV" file is transferred digitally to the CS4232 audio mixer and processor 80 under control by the CPU 42 which in turn decodes it through a 16-bit DAC to an analog output before mixing it with the other possible audio sources for output to the system audio amplifier 134.

The system's sound generator 86, which is contained in the MIDI audio subsystem discussed more extensively below, produces an analog audio output routed to the CS4232 audio mixer and processor 80.

The microphone 84 can be connected to the system for recording, karaoke and other musical voice input applications. The microphone input is preferably routed through a pre-amp 130 to match levels with the other audio sources. This analog audio input connects to the CS4232 audio mixer and processor 80. The system should preferably permit recording of microphone input as well as pass-through to the audio mixer and processor 80. These mixer and processor features are preferably accommodated by the CS4232 mixer and processor 80. Recording can be accomplished through a 16-bit ADC with PCM sampling at 44.1, 22.05, and 11.025 kHz. This encoding can be performed in the CS4232 mixer and processor 80.

As an additional source of music audio information, the audio output of the modem 70 can be played through the player's audio system so the user can hear a dial tone or busy signal when dialing up an on-line service, for example. The modem audio output can optionally be routed through a pre-mixer 142 for mixing with alarm and bell tones from the CS4045 controller 48, 50, which can in turn be made audible by the audio mixer and processor 80.

Bus Subsystem

The local CPU bus 108 links the main processor CPU 42, graphics controller 52, main memory 46, the CS4041 controller 66, and the timers, clocks and DMA/Internet Controller 48, 50, and the co-processor bus 150 (see FIG. 5) with a preferred 50 MB/sec throughput. An Industry Standard Architecture (ISA) Bus 144 has a preferred 8 MB/sec throughput and is used to link the 37C666 I/O controller 78, the audio mixer and processor 80 and the modem 70. The bridge between the buses 108, 144 are preferably buffers 146. The preferred buffers 146 are bi-directional, 8-bit, 74LS245 type, with tri-state capabilities. The buffers 146 also preferably provide extra drive current to support the loading of the data and address buses by the peripherals.

MIDI Audio Subsystem

Referring to FIG. 5, the MIDI audio subsystem 38 generally provides the components for sound generation; the interface with the musical keyboard 10 and associated optional MIDI controls, such as foot pedals 98 and optional pitch bend and modulation controls 100; and monitoring and assurance of system integrity through various diagnostic procedures. The MIDI audio subsystem 38 has a bus 150 with a preferred throughput of 50 MB/sec and is linked to the music information processing subsystem 104 through a translator/bus master 162 that couples to the local CPU bus 108 (FIG. 3) in the music information processor subsystem 104.

The MIDI co-processor 94 provides central management of the MIDI audio subsystem 38. The MIDI co-processor 94 is preferably a high performance, integrated processor containing a 32 bit CPU with a 32 bit bus, 1 KB of 4-way instruction cache, 4 KB of static RAM, two 32 bit high-speed DMA controllers, two serial ports with baud rate generation, a bus watchdog, a periodic interrupt/system timer, an interrupt controller, and dual 8 bit parallel ports. Certain speed-sensitive, low latency CPU operations including keyboard scanning and interrupt handlers can be executed by code running in the instruction cache. The MIDI co-processor CPU 94 preferably has a built-in serial port 164 which can be used in manufacturing quality assurance testing to verify the workings of the entire assembly.

The main function of the MIDI co-processor 94 is to off-load the main CPU 42 (FIG. 3) during time critical functions such as keyboard/foot pedal scanning, audio processor sound generation control, MIDI data stream processing, and analog to digital conversion control for volume, balance, pitch bend, modulation, and keyboard after-touch. The MIDI co-processor 94 preferably has dedicated local DRAM and flash memory 166. The local flash memory 168 preferably stores diagnostic software, chip set initialization values, and a loader program for obtaining standard operating software from the hard drive which will run on MIDI co-processor local memory 166.

Sound generation is preferably provided by a MIDI sound generator wave table synthesizer 86. The MIDI wave table synthesizer 86, controlled by the MIDI co-processor 94, converts MIDI commands into an analog audio output which is sent back to the audio mixer 80 for mixing with the other audio sources (see also FIG. 3).

The MIDI wave table synthesizer 86 preferably includes an EMU-8000 audio processor 151 from E-mu Systems. Preferably, digital samples of 128 different instrument sets are stored in a sample memory or voice RAM 152 of preferably 8 MB, and up to 32 MB. The samples are preferably loaded into the voice RAM 152 from the hard drive 64 (FIG. 3) during system boot-up under routing control by the MIDI co-processor 94.

A dual port memory controller 154 allows both the MIDI co-processor CPU 94 and the main processor 42 to directly access the voice RAM 152. The MIDI co-processor CPU 94 preferably has direct access to quickly load the sample data from the hard drive 64. The audio processor 151 also preferably has direct access for playing samples with minimum load time delay. The dual port memory controller 154 is also configured to allow the audio processor 151 to access the memory 152 at 16 bits wide and to allow the MIDI co-processor 94 to access the memory 152 at 32 bits wide.

The wave table voice samples are read and processed by the audio processor 151 and digitally mixed into a digital audio output stream which is converted to a stereo analog audio output by a digital-to-analog converter 156, such as a Crystal Semiconductor DAC. The signals may be cleaned up with filters 158 and directed to the audio mixer 80 of the multimedia audio subsystem 34 (See also FIGS. 2 and 3). The audio processor 151 preferably has a dedicated 1 MB RAM memory 160 for storing instructions for further manipulation of the voice samples, such as control of their envelope parameters.

The MIDI music subsystem 38 also serves to scan and process input from the keyboard 10 and other MIDI devices. The musical keyboard 10 is preferably an 88 key, velocity sensitive keyboard by Fatar and is preferably accompanied by the foot pedal assembly 98. The keyboard/foot pedal interface 161 is designed to scan the keyboard 10 at a very high rate for superior resolution when measuring key velocity. The keyboard interface 161 can view sixteen switches at one time. The foot pedals 98 are preferably scanned with the same mechanism and at the same rate as the keyboard keys.

The keyboard and foot pedal interface 161 can consist of four 3 to 8 bit decoders and two 8 bit bus drivers. There are 88 keys on the preferred keyboard 10, with two switches per key. Each of the preferably three pedals also have two switches, thereby totalling 182 switches to be scanned per pass. The MIDI co-processor 94 is arranged to view 16 key-switches per scan, thus 6 long-word (32 bit) reads are required for one complete scan. To simplify and reduce the overhead to the MIDI co-processor 94, each set of sixteen switches can be assigned a unique word-sequential address. The MIDI co-processor 94 can support automatic bus sizing, so that if it is instructed to read a long word (32 bits) and the device is one word wide (16 bits), the MIDI co-processor CPU 94 will automatically perform two sequential word reads to obtain a total of 32 bits.

The scan electronics 96 preferably include a Motorola 68HCO5 chip with an analog multiplexer that can also poll and process pitch bend and modulation controls 100 as well as an optional volume pedal 163 for adjusting to the overall volume of the output of the audio processor 86.

The MIDI co-processor 94 is also preferably arranged to assist in start up procedures and to run diagnostic procedures on system hardware to ensure proper operation. On power-up, the MIDI co-processor 94 preferably performs the following duties: initializes the CS4041-4045 chip set 48, 50, 66 (FIG. 3); sets up the graphics controller; down-loads the default sound wave table from the hard drive 64 to the dual port memory 154 using its built-in DMA controller; and sets up specific user default settings, such as volume, balance, and sound table.

After the MIDI co-processor 94 is running its control program, it releases the main processor CPU 42, which then preferably boots an operating system off the hard drive 64.

Remote diagnostics, including software updates and repairs, can be run from a central off-sight facility through the modem 70 to aid in trouble-shooting. Because the diagnostics are stored in the MIDI co-processor local memory 170, these tests do not rely on X86 Windows 95 operating system functions.

The MIDI co-processor 94 preferably has full access to all the same devices as the main processor CPU 42 and preferably has the capability to run full diagnostics on the entire system. Both the MIDI co-processor 94 and main processor CPU 42 have access to each other's memory; however, the MIDI co-processor 94 preferably has priority over the main processor CPU 42. Preferably, the MIDI co-processor 94 and main processor CPU 42 are also responsible for updates to each other's flash memory for bug fixes, improvements and enhancements. This is accomplished through communication through the translator bus master 162.

The MIDI co-processor 94 communicates with the host main processor CPU 42 through two 8-bit wide mailboxes. When either the MIDI co-processor 94 or the main processor CPU 42 sets a bit within its mailbox to "1", an interrupt occurs and a specific message is transmitted based upon which bit is set. Potential messages from the MIDI co-processor 94 to the main processor CPU 42 can include error occurrences, input buffer status, variations to volume or balance, and the like.

Main processor CPU 42 to MIDI co-processor 94 interrupts generally mean that there is data waiting to be processed. For example, if a bit set to "1" represents that a buffer in the main processor CPU 42 has data to be processed, the MIDI co-processor 94 could use its high-speed DMA to move a pre-defined block of data to its own local address space for processing. Other bit sets could mandate other functions, such as retrieving the serial number from EEPROM 168.

The MIDI co-processor's address space can be divided into multiple segments, including local DRAM, audio processor DRAM, mail box, Flash ROM, 64K PC/AT I/O space, 128 MB main processor CPU space, and 1 MB BIOS PC/AT space. Similarly, the main processor CPU space can also be divided into segments; the lower 72 megabytes for standard PC/AT memory and BIOS space; the next 56 megabytes divided between the mailbox and VGA controller; the following 128 megabytes address for MIDI co-processor private space; and the last 1 megabyte for system BIOS.

Because there is a difference in bus architecture between the preferred Motorola MIDI co-processor 94 and Intel X86 processor preferred for the main processor CPU 42, a conversion or translation must occur for proper communications between the processors. One of the main differences between processors is on which byte lane the least significant byte is placed. Motorola places byte 0, address 0 on D31–D24; Intel places byte 0, address 0 on D0–D7. Four 8 bit bi-directional transceivers connect as follows:

| Motorola Bytes | | Intel Bytes |
|---|---|---|
| D31–D24 | | D0–D7 |
| D23–D16 | Connected to | D8–D15 |
| D15–D8 | | D16–D24 |
| D0–D7 | | D25–D31 |

The X86 family uses separate byte enables for each byte addressed, while Motorola uses A0–A1, SIZ0, SIZ1 to determine which byte is addressed using programmable logic. In order for communication to occur between processors, signals must be translated between byte enable and address/size.

The two processors also follow a different protocol for interacting with memory and I/O devices. The Intel processor has separate instructions for accessing memory and I/O devices while the Motorola processor treats all memory and I/O devices in the same manner. To adjust for this, a separate 64K address space is preferably assigned in the MIDI co-processor address space to generate the appropriate I/O access timing and signals in the main processor address space so that when the MIDI co-processor accesses the address space that is reserved for main processor memory space, the appropriate memory access timing and signals are generated. When the main processor CPU 42 accesses its memory space reserved for accessing the MIDI co-processor 94, only one set of timing and control signals needs to be generated. Should each CPU 42, 94 attempt to access the other's address space at the same time, priority is given to the MIDI co-processor 94 to avoid a deadlock condition. When the main processor 42 attempts to access the MIDI co-processor address space, logic in the Field Programmable Gate Array (FPGA) generates a bus request to the MIDI co-processor 94 and waits for a bus grant before the access occurs. When the MIDI co-processor 94 wants to access the main processor address space, logic in the FPGA generates a LREQ0 through the controller 66 (FIG. 3) and waits for a LGNT0 to be returned from the controller 66 before completing the access.

To ensure that the MIDI co-processor 94 has complete control over the main processor 42 for proper start-up and diagnostic purposes, it is preferably arranged to directly control the main processor reset line.

The MIDI co-processor 94 also controls a write-secure EEPROM 168 that contains information including the system serial number, date of manufacture, hardware model type and version, and user installation date for warranty purposes. Once it has been written to, only certain parts of the EEPROM 168 can be altered.

Software Subsystem

Figure 6:
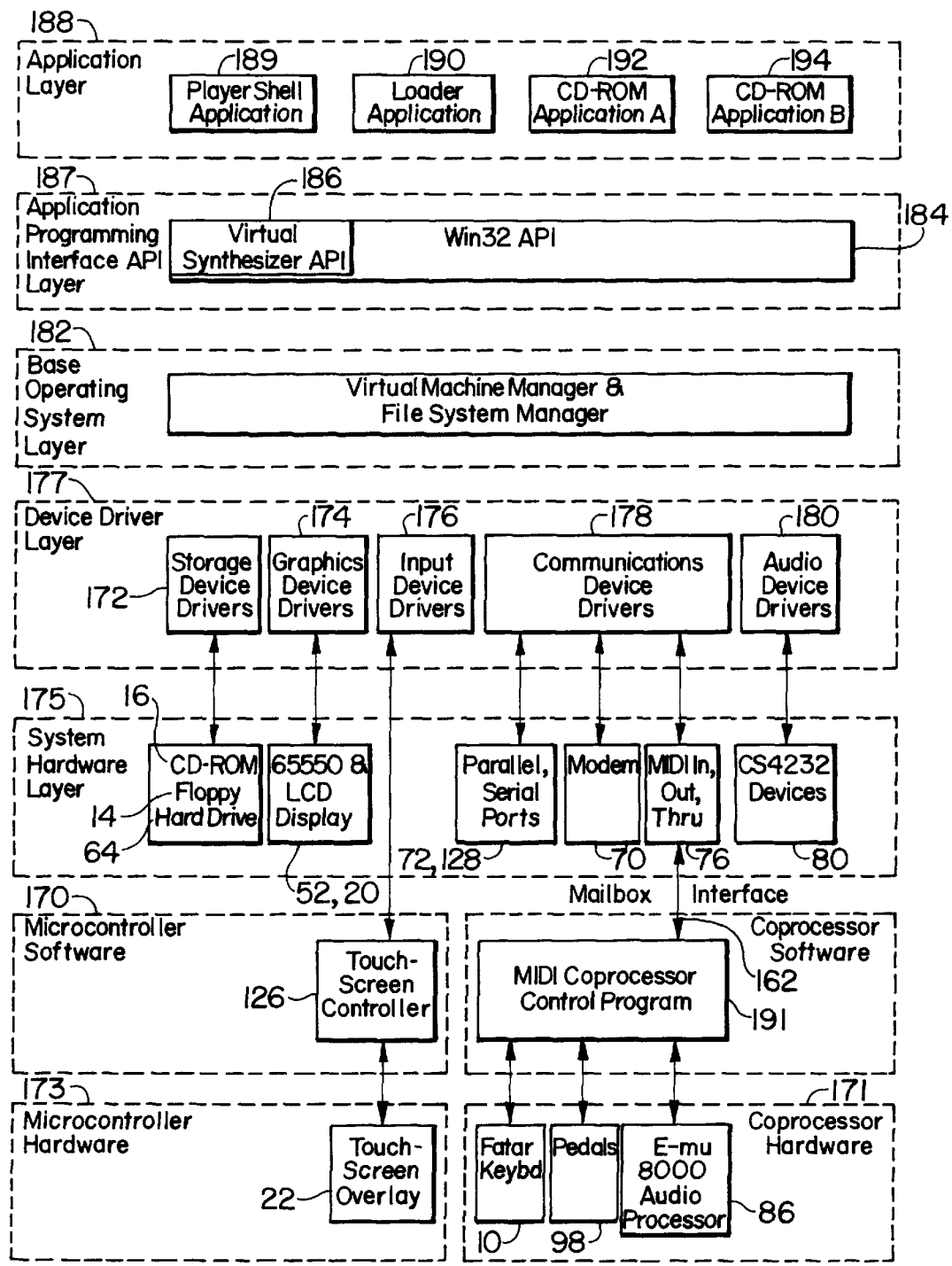
FIG. 6 is an exemplary software hierarchy for the musical instrument system of the invention.

Referring to FIG. 6, the components of the musical instrument system controlled by the graphical user interface are linked through multiple levels of software in a generally known manner. The musical instrument system utilizes micro-controller software 170 in the MIDI co-processor 94 and the touch screen controller 126 to manage the interaction with the co-processor hardware 171, including the musical keyboard 10, the keyboard pedals 98 and the MIDI sound generator 86. The touch screen controller 126 manages the input of signals from the touch screen overlay 22, constituting micro-controller hardware 173.

On a less dedicated level, the information sources of the CD-Rom drive 16, floppy disk drive 14 and the hard drive 64 are controlled through storage device drivers 172. The graphics controller 52 (FIG. 3) and the flat panel display 20 are controlled by graphics device drivers 174. Input device drivers 176 are used to communicate with the touch screen controller 126 while communications device drivers 178 are used to interface with the parallel and serial ports 72, 128, modem 70 and MIDI ports 76. An audio device driver 180 establishes control of the multimedia audio processor 80.

The various drivers are further managed by an operating systems layer 182, which is preferably the Windows '95 platform by Microsoft Corporation. Applications used with the musical information system are preferably linked to the operating system through a Win32 API 184 and a Virtual Synthesizer API 186 within an API layer 187.

The applications layer 188 can include a player shell application 189, a loader application 190 and can further include applications 192, 194, presented such as through CD-Rom, for execution with the musical instrument system.

The components of the base operating system layer 182, the device driver layer 177, the system hardware layer 175, the micro-controller hardware 173 and the co-processor hardware 171 can be developed and operated according to conventional personal computer and Windows'95 technologies parameters and guidelines.

The loader application 190 is preferably developed to manage loading and starting of the application programs after initial start-up procedures. Preferably, the initial start-up procedures include start-up of the main components to the virtual machine manager and file system manager 182; loading and initialization of all required device drivers 172, 174, 176, 178 and 180; and initialization of the hardware devices in the system hardware layer 175. The loader application 190 is preferably the default application on system start up. After initial start-up, the loader application 190 preferably launches the player shell application 189 to establish the graphical user interface according to the invention.

The loader application 190 is also preferably developed to launch other applications 192 and 194 when started from the graphical user interface of the system as discussed more fully below with reference to FIG. 25.

The Virtual Synthesizer API 186 preferably contains program functions for receiving/sending individual MIDI data packets from the MIDI hardware; recording/playing timed streams of MIDI data packets from/to the MIDI hardware; and handling all layering of musical instrument sounds.

The touch screen controller software 126 polls the touch screen overlay 22 at regular intervals and communicates touches on the touch screen to the operating system drivers in layer 177.

A MIDI co-processor control program 191 preferably handles scanning and translating user input on the musical keyboard 10 and pedals 98 into MIDI input messages, which are sent to the operating system drivers in layer 177, as well as translating MIDI output messages into commands to the audio processor 86. The MIDI co-processor control program 191 is also preferably responsible for boot-up tests and diagnostic routines which test the co-processor hardware and generate error notifications, if necessary, and for downloading sample sets into the voice RAM 152 (FIG. 5) from the main memory 46 (FIG. 3) via DMA operations through the mailbox hardware 162 (FIG. 5).

The player shell application 189 provides the main graphical user interface for operating the musical instrument system as set forth below with reference to FIGS. 7–27. The player shell application 189 is preferably written to load graphics from the hard drive through Win32 API functions which communicate through the base operating system's file system manager 182 to the device driver 172 in charge of the hard drive 64, and then presents them to the display 20 through Win32 API functions which communicate through the base operating system's Virtual Machine Manager 182 to the device driver 174 in charge of the display 20. After a graphical control screen is displayed, the player shell application 189 waits for user input from the musical keyboard 10 or the touch screen 22.

On input from the touch screen 22, the system reacts as follows: the touch screen scanner software 126 registers a contact with the touch screen 22 and a hardware interrupt is sent to the main processing unit 42 (FIG. 2); the input device driver 176 responsible for the touch screen 22 retrieves the X,Y position of the user contact from the touch screen scanner 126; and an input message is formulated and passed through the operating system to the player shell application 189 through the standard input notification functions of the Win32 API 184, and the player shell application 189 executes the system function corresponding to the user input.

On input from the musical keyboard 10, the system reacts as follows: A NOTE ON or NOTE OFF is registered by the MIDI Co-processor Control Program 191, and the co-processor CPU 94 (FIG. 2) formulates the note message into a MIDI data packet. A hardware interrupt is sent to the main processing unit 42 (FIG. 2). The communications device driver 178 responsible for the co-processor 94 reads the MIDI data packet from the co-processor 94. A MIDI input message is formulated and passed through the operating system to the player shell application 189 through the MIDI functions of the virtual synthesizer API 186, and the player shell application 189 executes the system function corresponding to the user input.

If an input from the musical keyboard 10 or the touch screen 22 instructs the player shell application 189 to play music through the MIDI synthesizer 86 (FIG. 2), the player shell application 189 formulates a MIDI output message to be sent to the synthesizer 86. The player shell application 189 calls a function from the Virtual Synthesizer API 186 to pass the message on, which passes the MIDI data through to the MIDI router hardware via an operating system call to the correct communications device driver 178.

The device driver 178 causes a hardware interrupt via the mailbox mechanism 162 to the MIDI co-processor CPU 94. In response, the MIDI co-processor CPU 94 reads the MIDI output message from the device driver 178 through functions in the MIDI co-processor control program 191. The co-processor control program 191 plays the MIDI data by interacting with the audio processor 151 to load and play the correct sample of the correct instrument sample set.

Consolidated Control Through Graphical User Interface

According to an aspect of the invention, music information access and processing, as well as sound parameter control, are performed solely through a visual input means such as a graphical user interface with touch control. Preferably, a plurality of interactive screens presented by the graphical user interface facilitate control of the musical instrument system including instrument selection and parameter control and single screen ensemble control as well as the management of music information from the various available sources.

The graphical user interface of the musical instrument system is preferably controlled through a touch screen system to facilitate rapid and convenient adjustment of system parameters. This arrangement facilitates understanding by the player and enables "real time" adjustment by professionals, particularly in the midst of a performance.

The graphical user interface can alternatively be controlled and manipulated by a mouse, joystick or other signal input system. While the preferred mode of actuation is a touch screen, it is contemplated that the graphic controls of the invention may have application in environments in which a mouse or other user interface is involved. Thus, terms, such as touch, contact, press, click and manipulate are used interchangeably herein to refer to the actuation of the function represented by a graphic image by user action.

Figures 7, 7A:
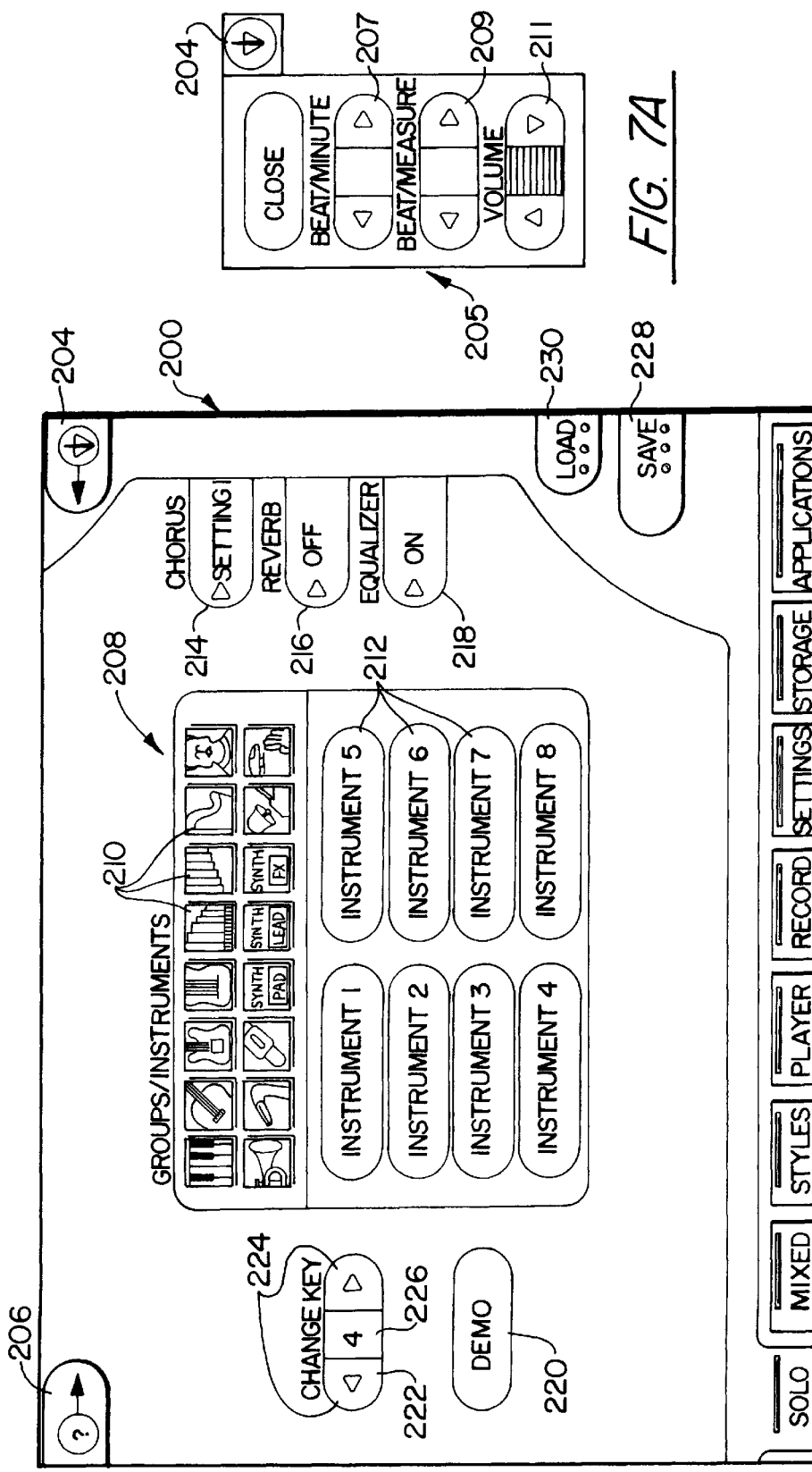
FIG. 7 is an exemplary graphical user interface control screen of the invention for single instrument sound or voice selection.
FIG. 7A is a preferred graphical user interface control screen for metronome functions.

As shown in FIG. 7, a control screen 200, which can serve as a control graphic, presented by the graphical user interface of the invention can include a standard set of "buttons" that are available on every screen throughout operation of the musical instrument system. These buttons can include an access bar 202 and provide a plurality of submenu functions. The standard buttons can also include graphic images for metronome control 204 and help 206. The images presented by the graphical user interface can be varied as to artistic screen design, colors and arrangement within the scope of the invention. To facilitate an understanding of the images presented by the graphical user interface and their operation, a set of generic sub-menus for commonly used functions, such as saving and loading will be set forth.

As shown in FIG. 7A, the metronome control icon 204 can activate a subscreen 205 displaying control arrows 207 for controlling the beats per minute, control arrows 209 for controlling the beats per measure, and control arrows 211 for the relative volume of the metronome.

As shown in FIG. 7, the solo instrument selection screen 200 allows selection from, for example, one hundred, twenty-eight MIDI instruments on a single screen by way of an instrument selector area 208. Category icons 210 can run across the top of the instrument selector area 208. The selection of a category by contact with one of the category icons 210 can cause a display of individual instruments unique to each category on a plurality, such as eight, buttons 212 preferably positioned under the category icons 210. The individual instrument buttons 212 are preferably "radio buttons" in which turning one on turns another off, with no more than one button selected at a time. The system is preferably configured so that the selected instrument sound is immediately effected upon its selection.

The solo instrument control screen 200 preferably includes a plurality of effects buttons, for example, for chorus 214, reverb 216 and equalization 218. The buttons 214, 216, 218 can be activated to present pull-down or pop-up screens to provide alternatives for controlling the effects. The selected mode of each effect is preferably available in the sound output of the system upon selection.

The solo instrument control screen 200 preferably includes a button 220 for activating a demonstration of the sound of the selected instrument and effects. The demonstration button 220 can activate the system to play a short example of a song using the currently selected instrument. The system is preferably configured so that pressing any button on the screen 200 will interrupt or stop the demonstration mode.

The solo instrument control screen 200 preferably includes a button 222 for activating a key change, with directional arrows 224 and a numeric indication 226 of the number of semitones transposed.

Figure 8:
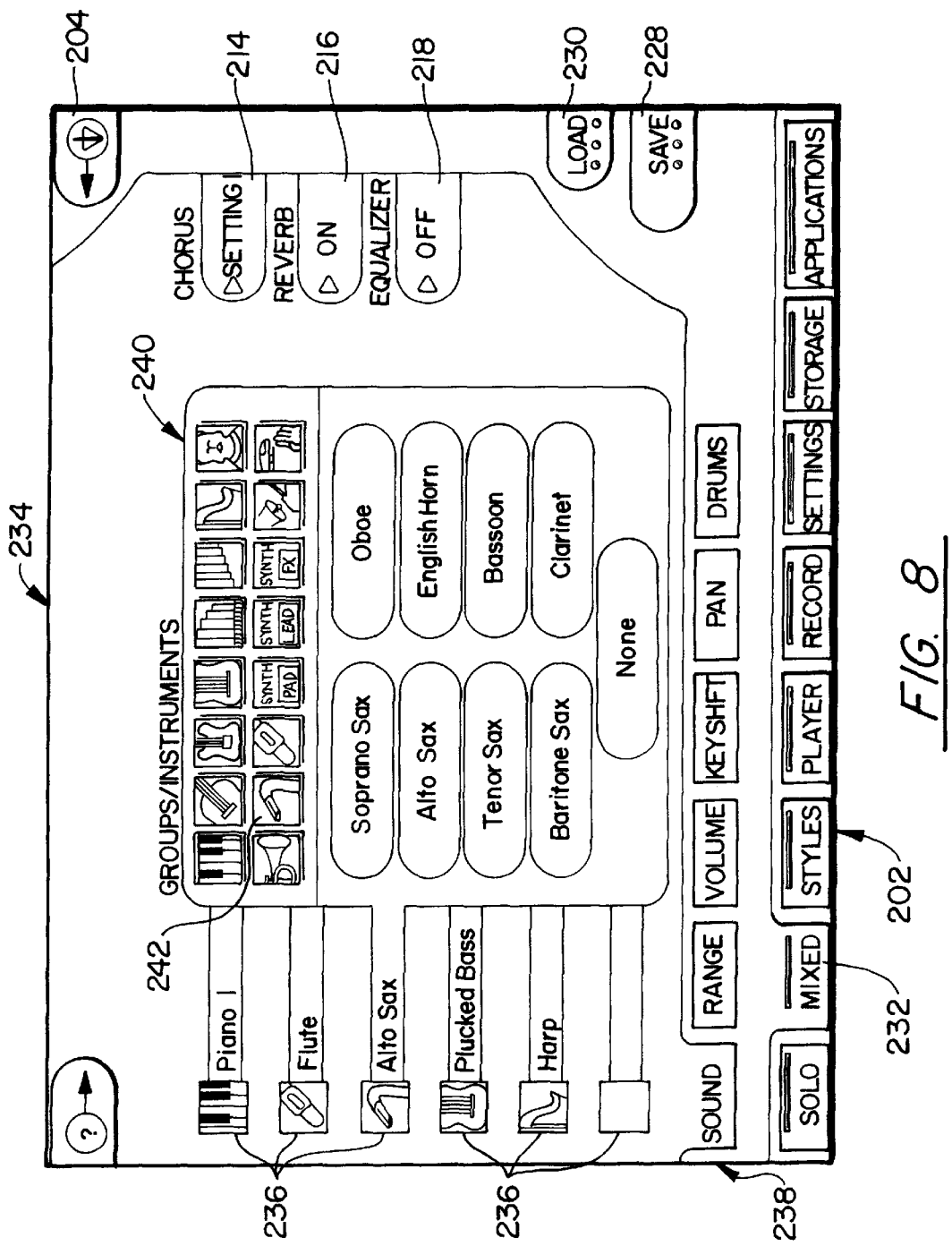
FIG. 8 is an exemplary graphical user interface control screen of the invention for instrument ensemble sound or voice selection.

Referring to FIG. 8, along the access bar 202, a second control screen directed to controlling an ensemble of mixed selected instruments is available by selecting a button 232 labeled, for example, MIXED. Upon selection, the screen image 234 can present a plurality of boxes 236 or other graphic images to represent musical instrument layers in the ensemble. The plurality of layers, for example, six, can each correspond to a selected instrument and effect arrangement. The six possible instruments comprising the mix can be indicated by the boxes 236. The mixed instruments control screen preferably presents an access bar 238 including options for sound, range, volume, key, pan and drums control.

Under the sound selection mode, the selection of a layer by activating one of the layer boxes 236 presents an instrument selection screen 240, which is preferably similar to the solo instrument screen 208 (FIG. 7) discussed above. The graphical user interface is preferably arranged so that the instrument group icon 242 selected within the instrument selector screen 240 is placed in the layer box 236. The particular instrument within the instrument category and its associated effects can be selected as discussed above in reference to FIG. 7.

The user can change an instrument in the mix by touching a layer box 236. The instrument selection screen 240 can visually link to that layer (such as Alto Sax) preferably by highlights. The user then uses the instrument selector 240 in the same manner as with solo instrument but can preferably also select a NONE button, which simply clears that layer and inserts no instrument (see lower box 236). The instrument selector screen 240 remains on the screen until a new layer is selected. When a non-selected layer with an assigned instrument is selected, the instrument selector 240 will display the instrument group and instrument currently assigned to that layer. The sound ensemble selected can be saved, such as to the hard drive, and a previously stored ensemble can be retrieved from an information source using the save and load buttons 228, 230. Further details are set forth below in reference to FIGS. 26 and 27.

Figure 9:
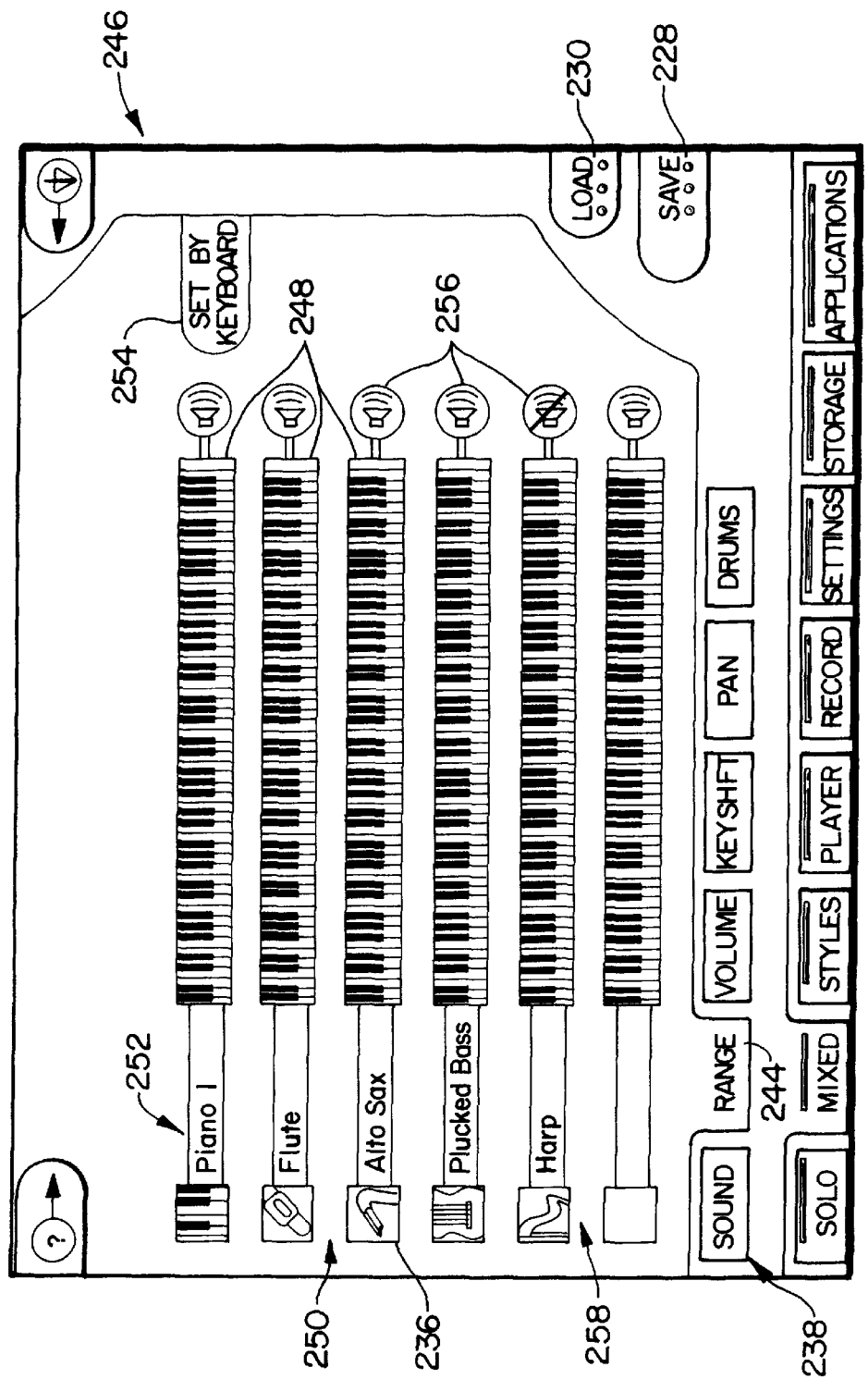
FIG. 9 is an exemplary graphical user interface control screen of the invention for single screen keyboard range allocation for the instrument ensemble.

Referring to FIG. 9, the mixed instruments access bar 238 preferably includes a button 244 to activate a key range selection screen for establishing the keyboard range for each layer on a single screen. The button 244 can be labeled RANGE. The key range selection screen 246 includes an adjustment graphic, such as a keyboard image 248, for selecting the range of keys on the musical keyboard that will produce an instrument and effect designated for a particular layer 250, as selected in a prior mixed instrument sound selection screen (FIG. 7). Preferably, the key range selection screen 246 presents a keyboard graphic 248 corresponding to the size of the musical keyboard used with the system, for example, an 88-key register as shown. A separate keyboard control graphic 248 is provided for each of the layers of the mixed instrument ensemble. The layer box 236 preferably displays the icon of the musical instrument group previously selected for the layer 250 and the keyboard selection screen 246 preferably presents the name of the particular instrument selected from within the musical instrument group adjacent the associated layer box 236 and keyboard adjustment graphic 248 so that the user can quickly identify the sound to be attributed to the selected keyboard range.

The system can be configured to activate the keyboard range selection in a variety of ways. Preferably, the keyboard adjustment graphic 248 can be clicked or touched at the beginning of the desired range and dragged to the end of the desired range. The keyboard graphic 248 preferably highlights or provides some other instant visual indication of the range selected.

The layer 250 to be designated can be identified to the system by contacting the layer box 236 or by contacting the corresponding keyboard adjustment graphic 248. The layer 250 selected remains activated for adjustment until the layer box 236 or adjustment graphic 248 for another layer is contacted. The system is preferably configured so that all layers are unmuted and the first layer 252 is set to the full range of the musical keyboard and is highlighted for keyboard range adjustment.

The mixed instrument keyboard selection screen 246 can also provide a control button 254 labeled for example SET VIA KEYBOARD for activating keyboard range selection through the musical keyboard itself (not shown). The particular musical instrument layer is selected by contacting the layer box and the keyboard selection is entered by touching the control button 254. The control button 254 preferably highlights, signalling the user to strike two keys on the musical keyboard to set the upper and lower limits of the desired range. The control button 254 lowlights, indicating the deactivation of the keyboard selection mode, and the keyboard adjustment graphic for the selected layer indicates the key range. The set via keyboard function is also preferably deactivated by contacting any other control button or image on the screen 246.

The keyboard selection screen 246 preferably provides a mute control icon 256 for each layer. The icon 256 can be contacted to mute and restore the sound of the associated layer. Each mute control icon 256 preferably visually displays the sound status; the mute control icon 256 displays, for example, that layer 258 for harp has been muted, while the remaining mute control icons indicate that their respective layers are configured to produce sound. The mute control icons 256 are preferably configured so that any of them can be contacted without changing to the layer presently selected.

When the adjustment graphic 248 is touched, it activates and highlights that layer, for example, layer 250. That layer 250 remains active and highlighted until another layer graphic is touched. The mute buttons 256 are an exception in that touching them does not activate the associated layer.

Figure 26:
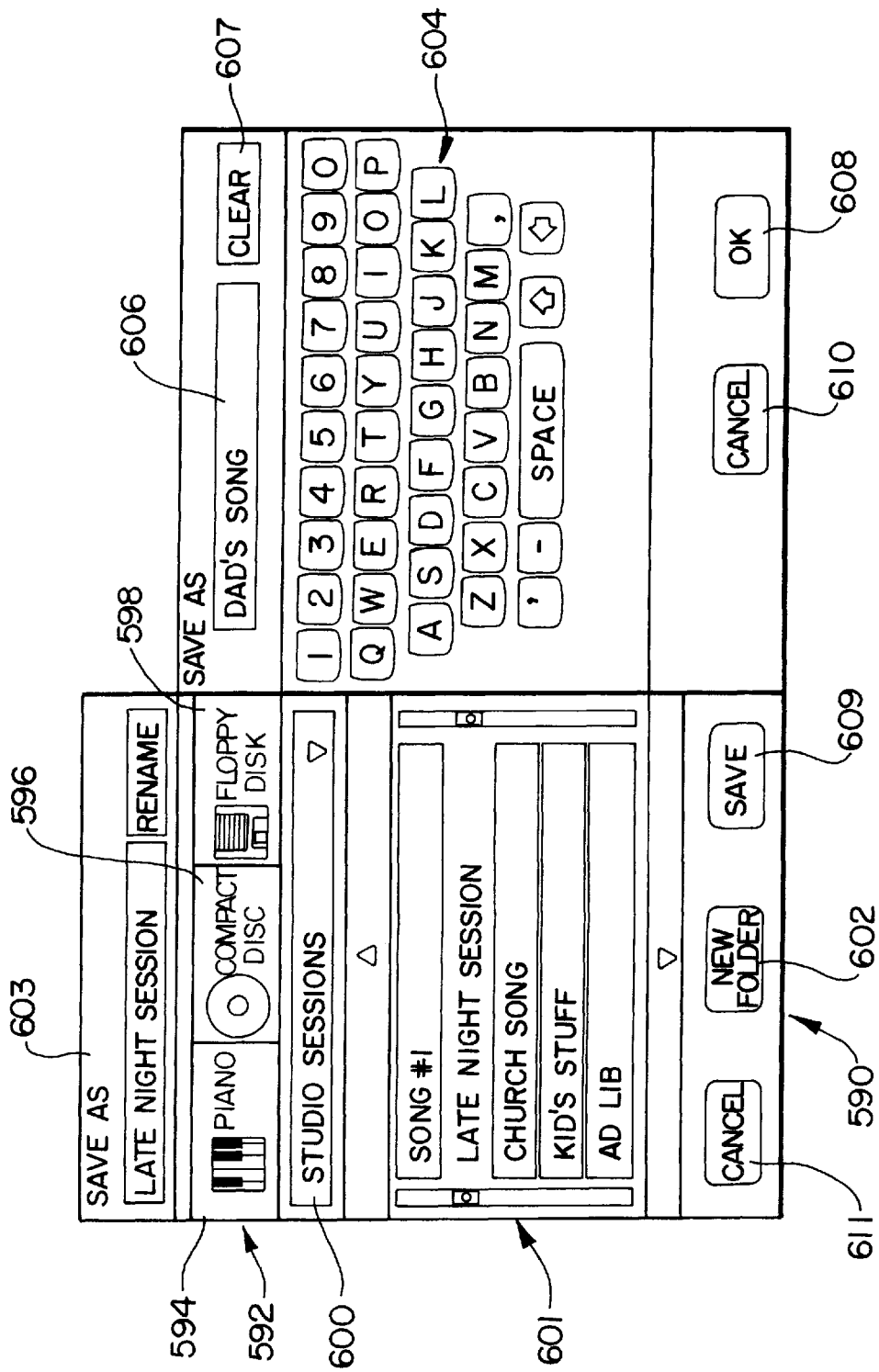
FIG. 26 is an exemplary graphical user interface control screen of the invention for saving settings established through various control screens.
Figure 27:
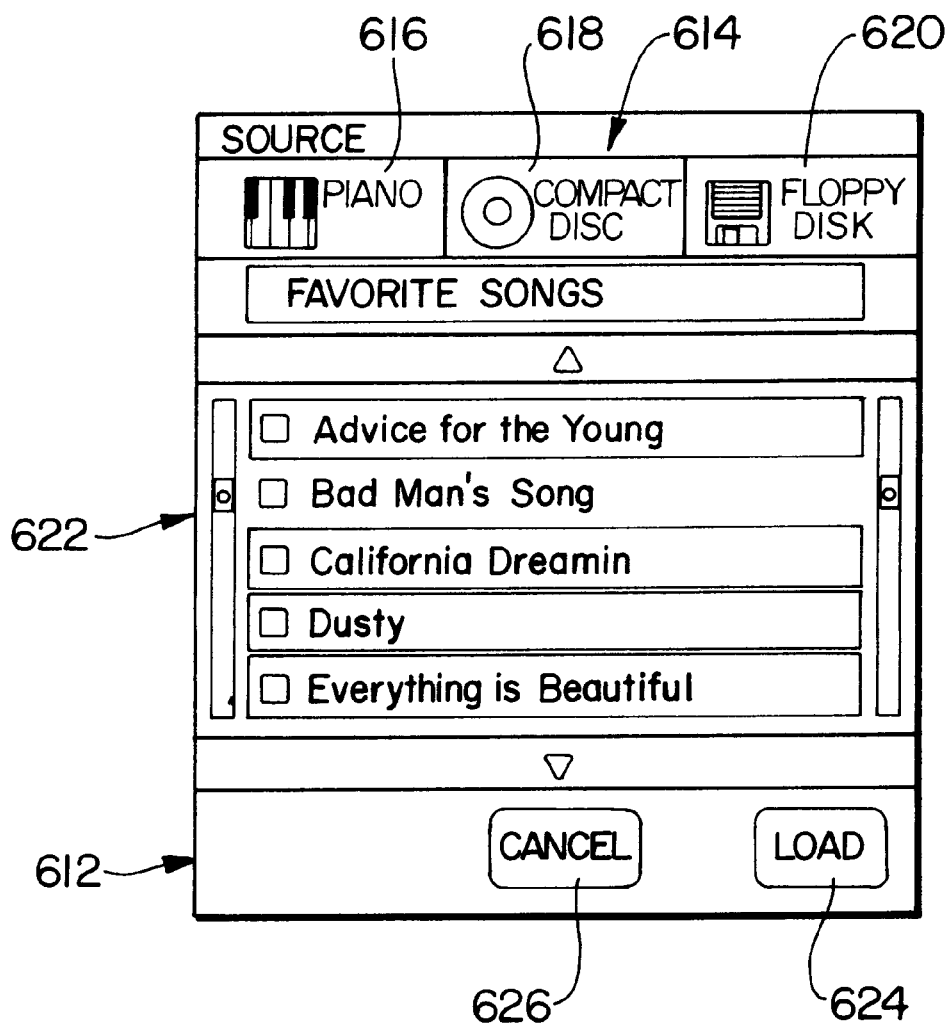
FIG. 27 is an exemplary graphical user interface control screen of the invention for retrieving settings previously established.

The sound ensemble selected can be saved, such as to the hard drive (FIG. 2), and a previously stored ensemble can be retrieved from an information source using the save and load buttons 228, 230 (see FIGS. 26 and 27).

Figure 10:
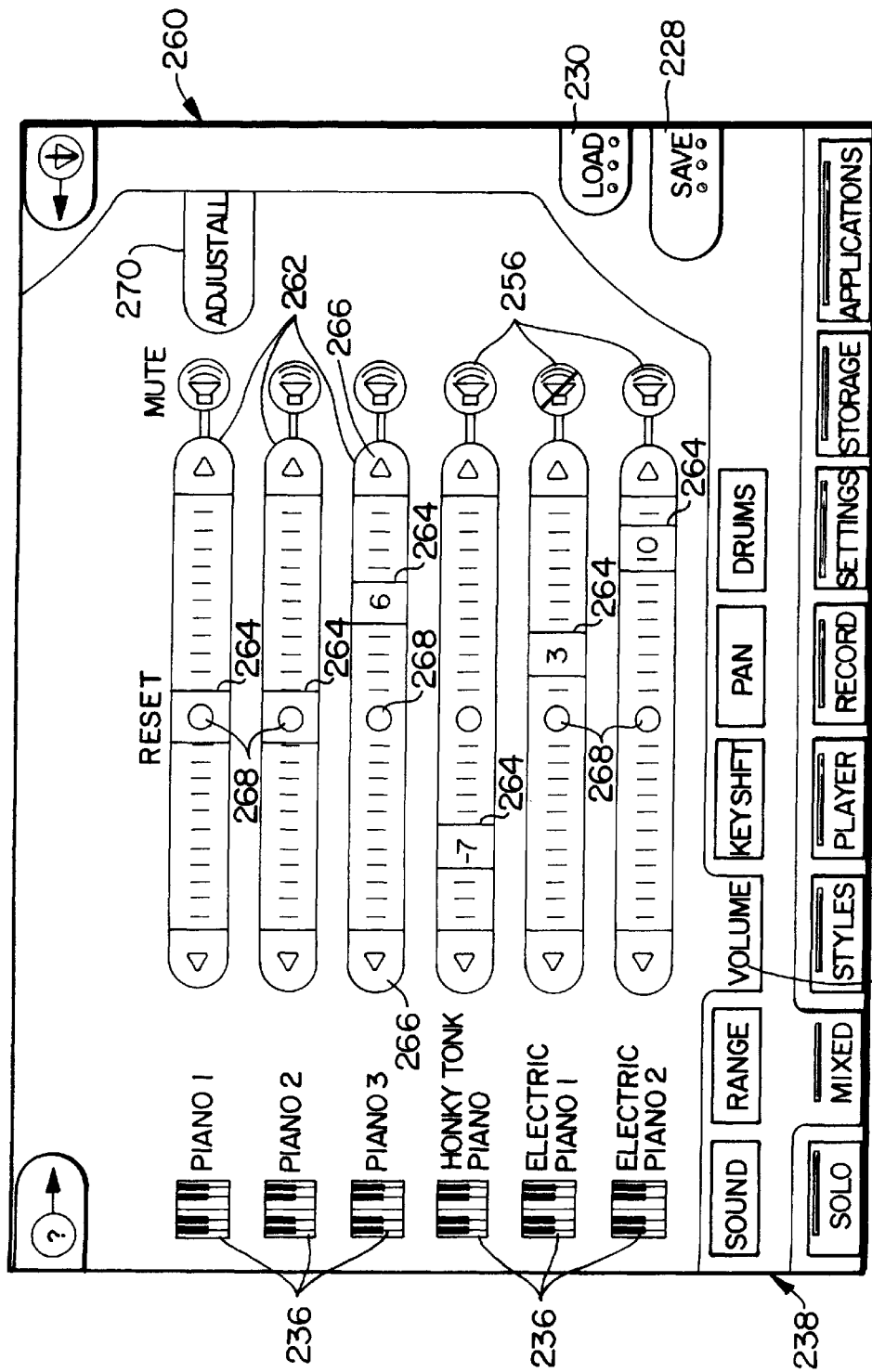
FIG. 10 is an exemplary graphical user interface control screen of the invention for single screen volume adjustment for the instrument ensemble.

Referring to FIG. 10, the mixed instruments access bar 238 preferably includes a button 258 to activate a volume adjustment screen or volume adjustment control graphic 260 for single screen adjustment of all layer volumes. The button 258 can be labeled VOLUME. The volume adjustment screen 260 includes an adjustment graphic, such as a volume slider 262, for adjusting the volume level for each musical instrument layer selected in a prior mixed instrument sound selection screen (FIG. 7). Preferably, the volume slider 262 presents a movable marker 264 that appears at a touched location and preferably displays a level number. The volume level and the corresponding position of the marker 264 can also be controlled by contacting and holding the arrow icons 266 at the ends of the volume slider 262. The volume slider 262 can also present a central marker 268 that can be contacted to reset the volume to a default level and position the marker 264 to a centered position.

Each layer box 236 preferably displays the icon of the musical instrument group previously selected for the layer and the screen 260 preferably presents the name of the particular instrument selected from within the musical instrument group adjacent the associated layer box 236 and volume slider 262 so that the user can quickly identify the sound being adjusted for volume.

A separate volume slider 262 is provided for each of the musical instrument layers of the mixed instrument ensemble. The layer to be designated can be identified to the system by contacting the layer box 236 or by contacting the corresponding volume slider 262. The layer selected remains activated for adjustment until the layer box 236 or adjustment graphic 262 for another layer is contacted.

To adjust all levels, a user can contact an ADJUST ALL button 270. All instrument layers highlight, then the user may slide any one of the six markers 264, any of the up/down arrows 266, or any one of the 6 reset markers 268, to simultaneously adjust all layers to the same volume level. The ADJUST ALL button 270 preferably remains in effect and highlighted until pressed again. The volume control screen 260 preferably provides a mute control icon 256 for each layer that can be contacted to mute and restore the sound of the associated layer as discussed above (FIG. 8). The mute setting selected in one subscreen for a layer remains in that state for other subscreens.

The volume settings selected can be saved, such as to the hard drive 64 (FIG. 2), and a previously stored ensemble can be retrieved from an information source using the save and load buttons 228, 230.

Figure 11:
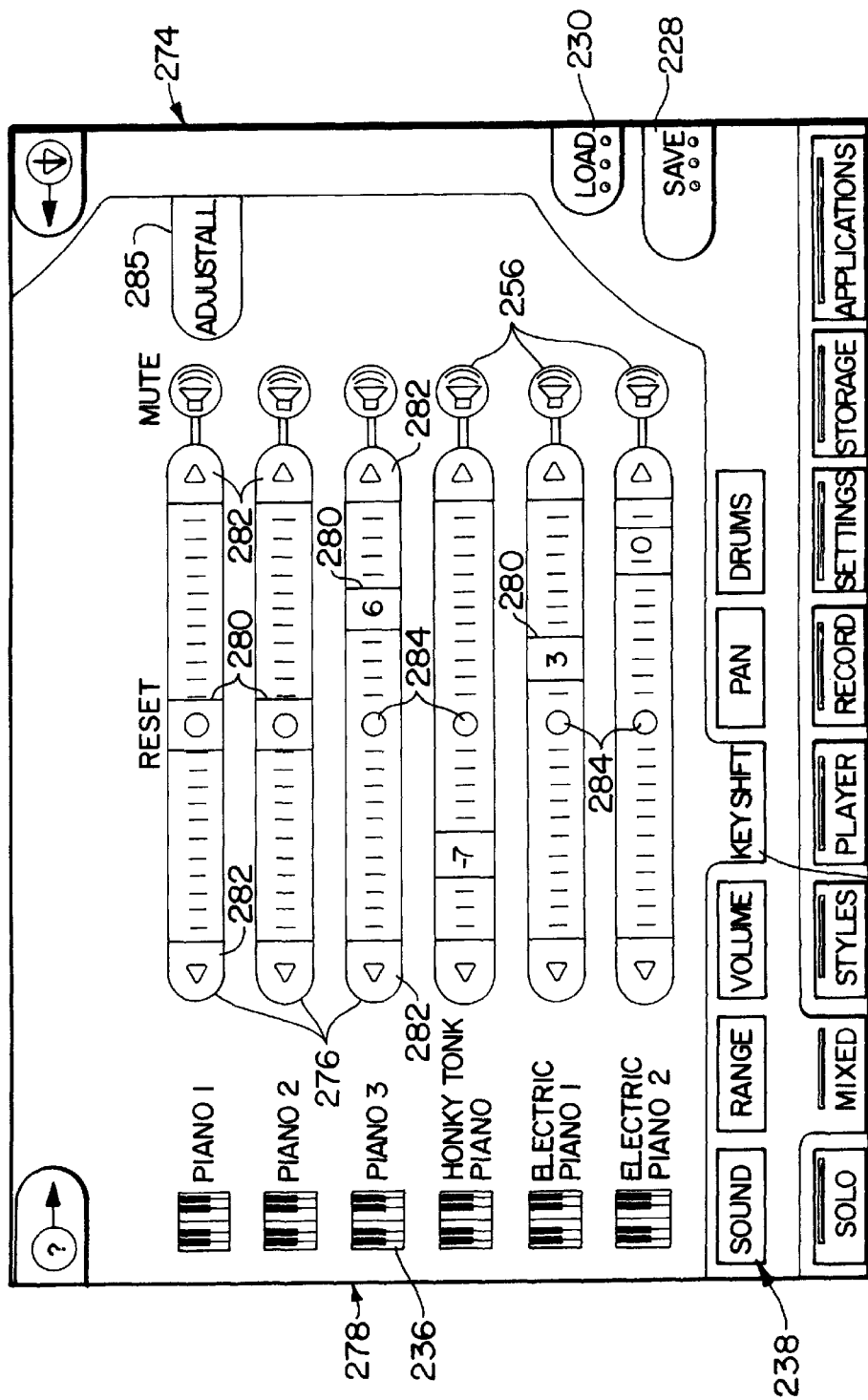
FIG. 11 is an exemplary graphical user interface control screen of the invention for single screen key transposition adjustment for the instrument ensemble.

Referring to FIG. 11, the mixed instruments access bar 238 preferably includes a button 272 to activate a key transposition screen 274 to adjust the relative position of all layers on a single screen. The button 272 can be labeled KEY SHIFT. The key transposition screen 274 enables the user to adjust the key of each musical instrument layer. The key transposition screen 274 includes an adjustment graphic, such as a key slider 276, for transposing the key of the corresponding instrument layer 278. The key marker 280 can be contacted and moved and preferably displays a plus or minus number representing the number of semitones of transposition for each musical instrument layer selected in a prior mixed instrument sound selection screen 234 (FIG. 8). The transposition and the corresponding position of the marker 280 can also be controlled by contacting and holding the arrow icons 282 at the ends of the key transposition slider 276. The key transposition slider 276 can also present a central indicator 284 that can be contacted to reset the key to a default value and position the marker 280 to a centered position.

The layer box 236 preferably displays the icon of the musical instrument group previously selected for the layer 278 and the key transposition screen 274 preferably presents the name of the particular instrument selected from within the musical instrument group adjacent the associated layer box 236 and key transposition slider 276 so that the user can quickly identify the instrument sound being transposed.

A separate key transposition slider 276 is provided for each of the musical instrument layers of the mixed instrument ensemble. The layer 278 to be designated can be identified to the system by contacting the layer box 236 or by contacting the corresponding volume slider 276. The layer 278 selected remains activated for adjustment until the layer box or adjustment graphic for another layer is contacted.

To adjust all levels, the user can click on a button 285 labeled, for example ADJUST ALL, all instruments highlight, then the user may slide any one of the markers 280, any of the 12 up/down arrows 282, or any one of the 6 reset markers 284 to simultaneously adjust all layers to the same key transposition. The ADJUST ALL button 285 remains in effect and highlighted until pressed again.

The key transposition screen preferably provides a mute control icon 256 for each layer that can be contacted to mute and restore the instrument sound of the associated layer as discussed above (see FIG. 9).

The key adjustment selected can be saved, such as to the hard drive 64 (FIG. 2), and a previously stored ensemble can be retrieved from an information source using the save and load buttons 228, 230.

Figure 12:
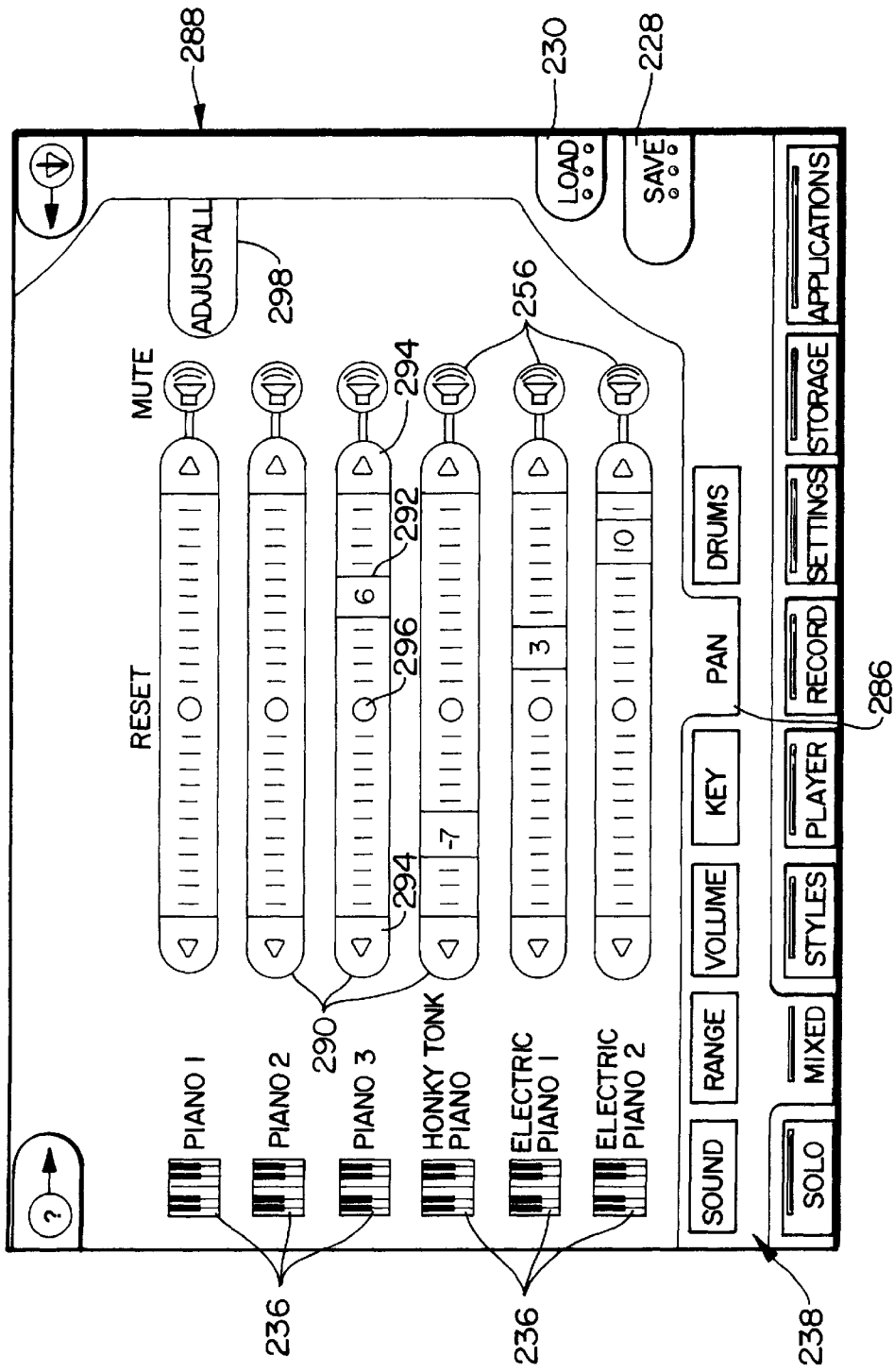
FIG. 12 is an exemplary graphical user interface control screen of the invention for single screen pan adjustment for the instrument ensemble.

Referring to FIG. 12, the mixed instrument access bar 238 preferably includes a button 286, labeled, for example, PAN, for presenting a pan adjustment screen 288 for controlling the balance of instrument sound for each instrument layer between left and right loudspeakers of the system (not shown). The pan adjustment screen 288 can provide control graphics similar to the keyboard range adjustment screen (FIG. 9), the volume adjustment screen (FIG. 10) and the key transposition screen (FIG. 11), including a plurality of instrument group layer boxes 236, preferably bearing instrument group icons, corresponding individual instrument labels and adjustment graphics, such as a pan slider 290. The pan slider 290 can include a moveable marker 292, adjustment arrow icons 294 and a reset marker 296 that operate as discussed above with respect to the volume adjustment screen 260 (FIG. 10). The pan control screen can further include mute control icons 256 for muting and restoring individual instrument sounds and a button for simultaneously activating all layers for adjustment.

The pan adjustment screen facilitates rapid adjustment of instrument group panning by presenting all the instrument groups and their pan controls on a single contact by first contacting an ADJUST ALL button 298.

The pan adjustment selected can be saved, such as to the hard drive 64 (FIG. 2), and a previously stored ensemble can be retrieved from an information source using the save and load buttons 228, 230.

Figure 13:
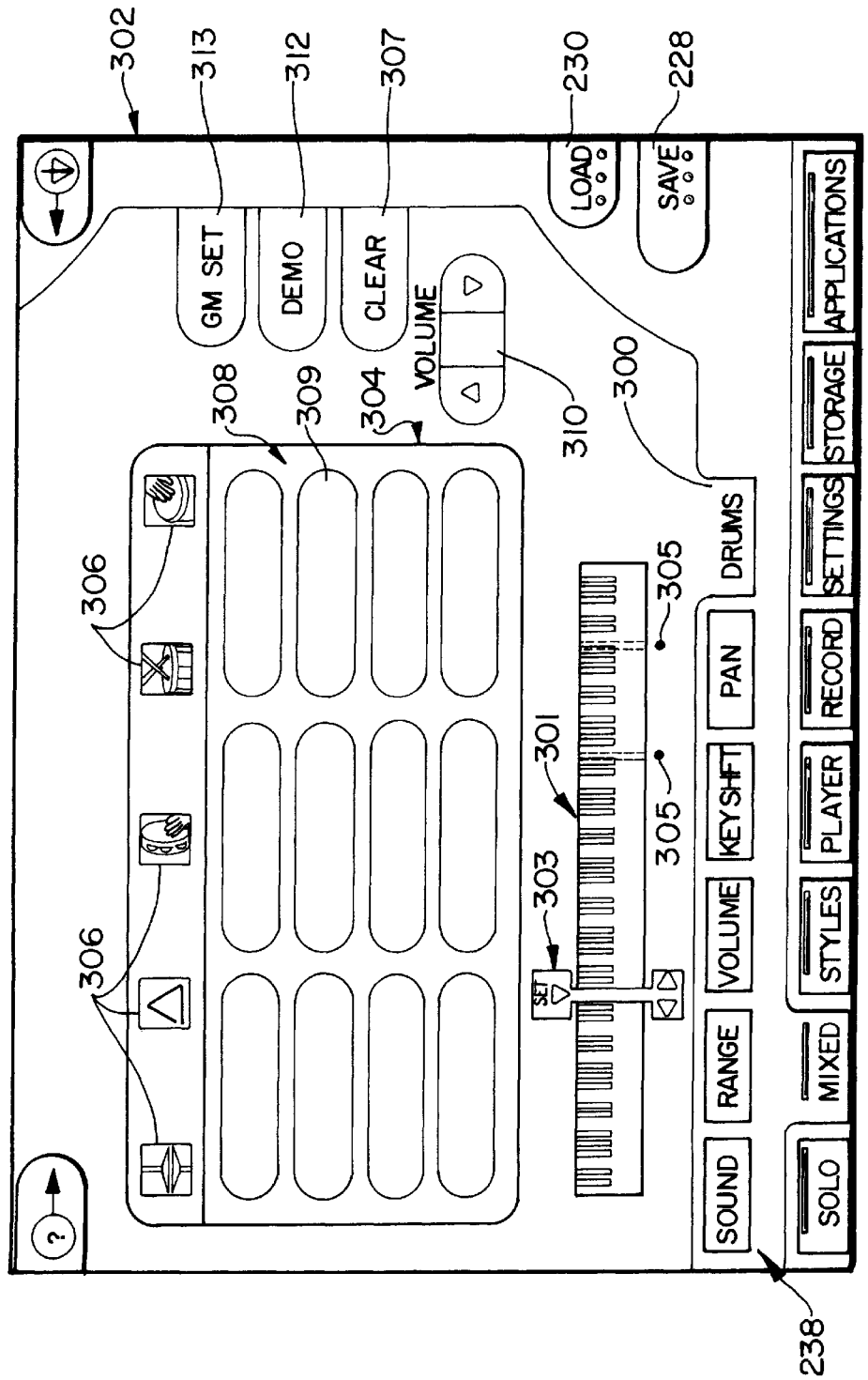
FIG. 13 is an exemplary graphical user interface control screen of the invention for drum sound selection.

Referring to FIG. 13, the mixed instruments access bar 238 preferably further provides a button 300, marked DRUMS for example, for presenting a drum sound selector screen 302. The drum selector screen 302 can present drum a selection area 304 similar to the multiple musical instrument selector screen discussed above in reference to FIG. 8. The drum selector screen 302 preferably includes a plurality of drum group boxes 306 for displaying drum group icons. When a drum group is selected, a subscreen 308 containing numerous drum voices within the drum group is preferably displayed. The drum voice is selected by contacting the desired drum voice button 309.

The allocation of the selected drum voice to a particular key of the musical keyboard can be accomplished in a number of ways. The drum selector screen 302 preferably provides a keyboard graphic 301 displaying the keys of the musical keyboard 10 (FIG. 1) of the system.

An "I" shaped key indicator 303 can be provided to allocate a drum voice to a particular key on the musical keyboard 10 (FIG. 1). The upper portion of the key indicator 303 can operate as a button to set the presently selected drum voice to the marked key on the keyboard graphic 301. The position of the key indicator 303 can be moved by contacting and dragging the key indicator at its base.

The drum selection screen 302 is also preferably interfaced with the musical keyboard 10 (FIG. 1) so that the drum voice can be set to a particular key by striking the desired key after the drum voice has been identified on the drum selector screen 302.

Once a key has been assigned a drum voice, the keyboard graphic 302 preferably displays an assigned key highlight 305 or other visual indication.

The drum selector screen 302 can also provide a volume control 310 for adjusting the level of the drum sounds and a demonstration button 312 for playing a sample of the selected drum voice. All allocated drum voices can be cleared by a CLEAR button 307. The drum voice can be assigned to keys established by the general MIDI standard by pressing GMSET button 313.

The drum voice arrangement selected can be saved, such as to the hard drive 64 (FIG. 2), and a previously stored ensemble can be retrieved from an information source using the save and load buttons 228, 230.

Figure 14:
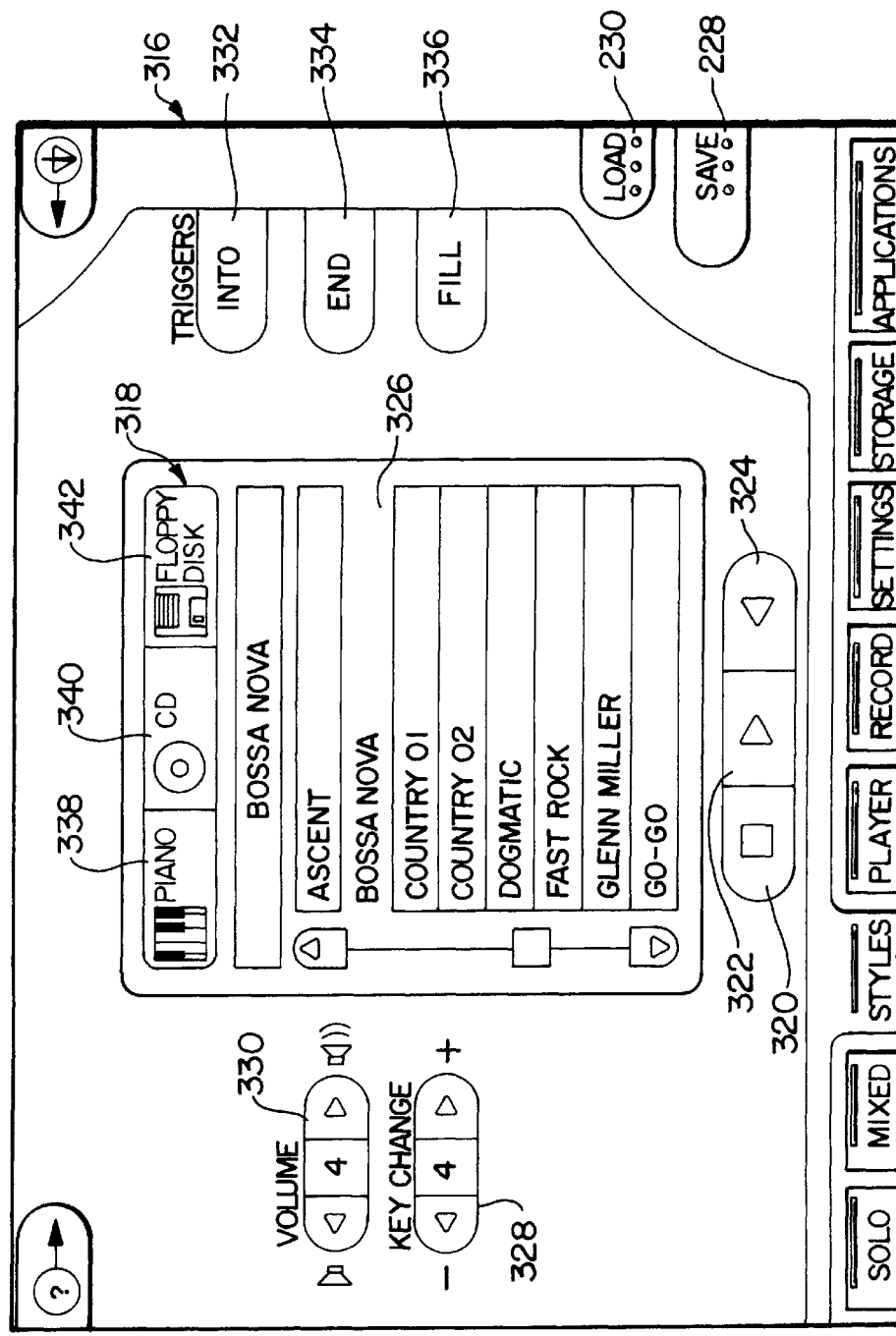
FIG. 14 is an exemplary graphical user interface control screen of the invention for syncopated style selection and control.

Referring to FIG. 14, a STYLES button 314 presents a styles selection screen 316 for selecting and loading a style routine from a source selected from one of the information sources indicated by the source selection graphic 318. The styles selection screen 316 preferably includes graphic buttons to stop 320, play 322, and start synchronized play 324 of the style rhythm upon depression of a first musical keyboard key (not shown).

To load a style, the user can select a style 326 from the selected source. To listen to that style 326, the user can contact the play button 322.

The style selection screen 316 can further include transposition 328 and volume 330 sliders. Also, trigger buttons to invoke INTRO 332, FILL 334 and END VARIATIONS 336 in the style rhythm can be provided.

The source selection graphic 318 preferably includes buttons for selecting the source of style files. These sources can include file in system memory 338, CD-ROM 340 or floppy disk 342 and can be expanded to include other sources.

As can be appreciated from the previous description of control screens, the graphical user interface of the invention is designed to provide consolidated control of the sounds produced through the musical keyboard-activated sound generator and provides a unified control for accessing and utilizing music related digital information from a variety of sources. Thus, the access bar 202 for the system preferably includes buttons for further categories, such as player, recording, settings, storage and applications for managing musical information from the various information sources provided by the system (See FIG. 2).

Figure 15:
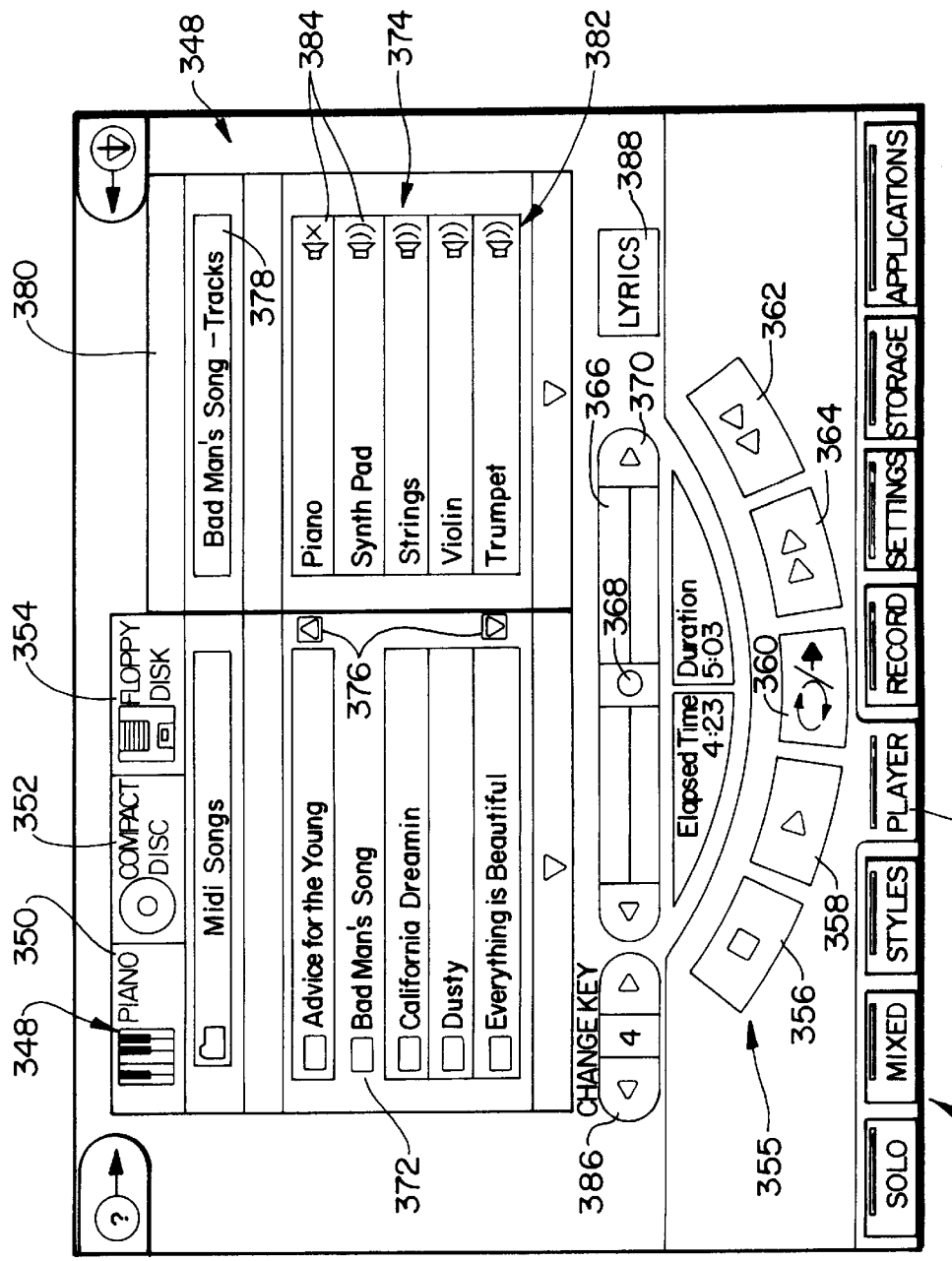
FIG. 15 is an exemplary graphical user interface control screen of the invention for music and audio player control.

Referring to FIG. 15, the system access bar 202 further includes a button 344, marked for example PLAYER, for accessing a screen or control graphic 346 for selecting and playing digital information from a variety of sources. The player screen 346 allows the user to control play of standard MIDI files from the hard drive, CD drive or floppy disk drive; CD audio tracks; recordings made on the piano and the like.

The source is determined by selectors in the source graphic 348. The PIANO selection 350 can be used to play music information from the hard drive 64 and preferably defaults to a MIDI songs directory, but can access other directories. The source graphic 348 can also present options for compact disc 352 and floppy disk 354. The screen 346 provides a control bar 355 with operation buttons including stop 356, play/pause 358, continuous single play toggle 360, skip back to start of song 362, skip forward to start of next song 364. The operation buttons can further include a track slider 366 which can be manipulated by moving the marker 368 or the direction arrow icons 370. Rewind and fast forward can be accomplished through manipulating the slider 368 reverse and forward.

A file/song can be selected by contact with a labeled button 372 within a directory frame 374, which preferably highlights the track and loads it for playback. If there are more songs than slots in the directory frame 374, scroller bars 376 preferably appear to permit scrolling through the list. The directory frame 374 also includes a directory title box 378 with a pop-down function to list other directories options.

The player screen 346 can also permit transfer to a detail screen 380. The detail screen 380 can present the individual tracks 382 within a MIDI song and the instrument voices occupying those tracks. The title of the song is preferably shown in the box above the tracks 382. Each track 382 preferably provides mute control icons 384 for selectively muting individual track instrument sounds.

The player screen 346 also preferably provides a key change slider control 386 for transposing the entire file. The tempo of the song may be change through the functions available under the universal metronome control screen as discussed above in reference to FIG. 7A. If the system program detects karaoke lyrics within a selected MIDI file, a LYRICS tab 388 can be added to the player screen 346.

Figure 16:
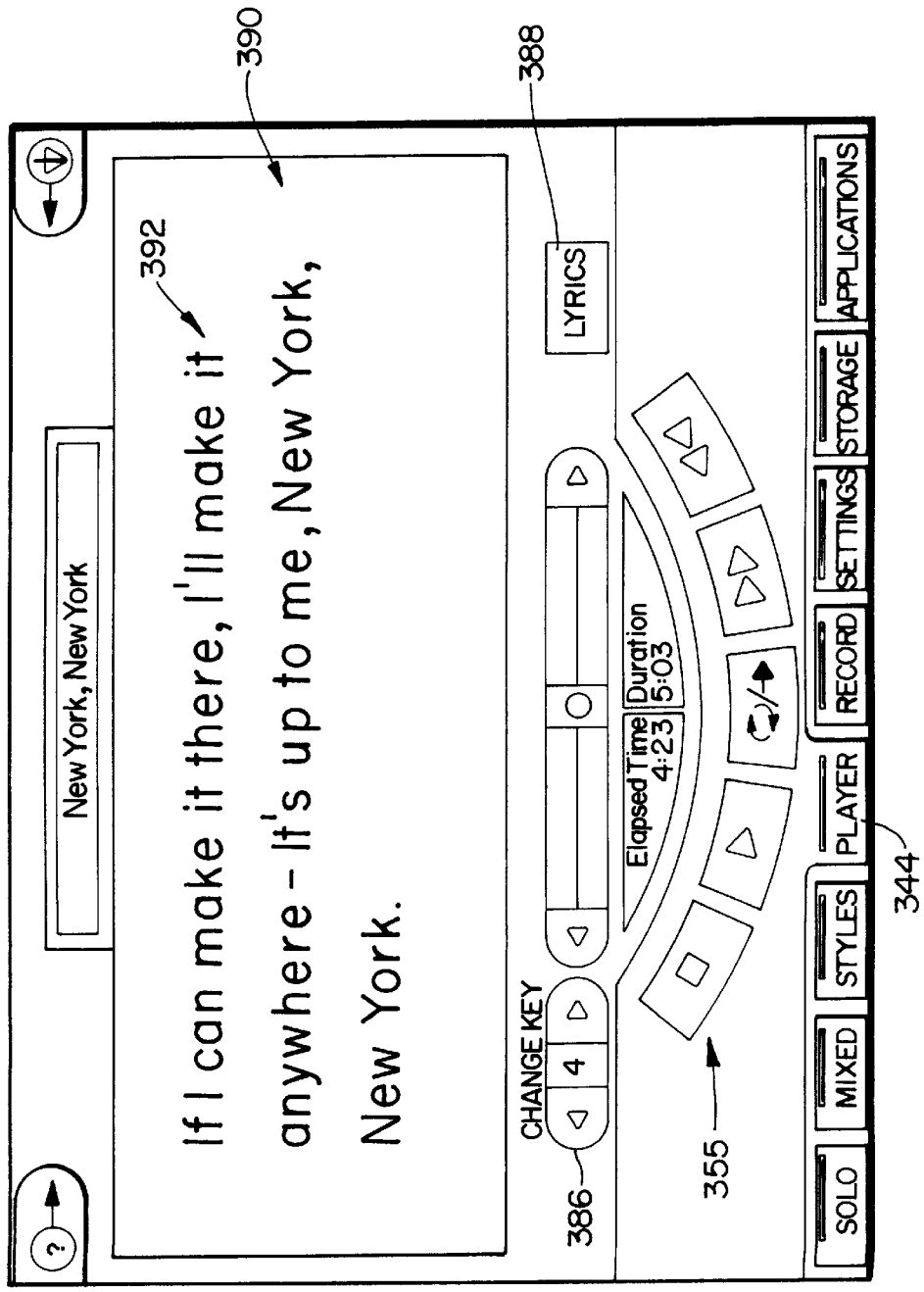
FIG. 16 is an exemplary graphical user interface control screen of the invention for music and audio player control as shown in FIG. 15 with the appearance of a lyrics screen.

Referring to FIG. 16, a selection of the LYRICS tab 388 presents a lyrics screen 390 displaying lyrics 392 preferably in large type, and readable from a distance. The song title currently playing is preferably displayed. The lyrics screen 390 preferably continues to display the control bar 355 and presents the key change control slider 386. This feature can be used to provide words for use during performance and enables mid-performance key changes by the user.

Figure 17:
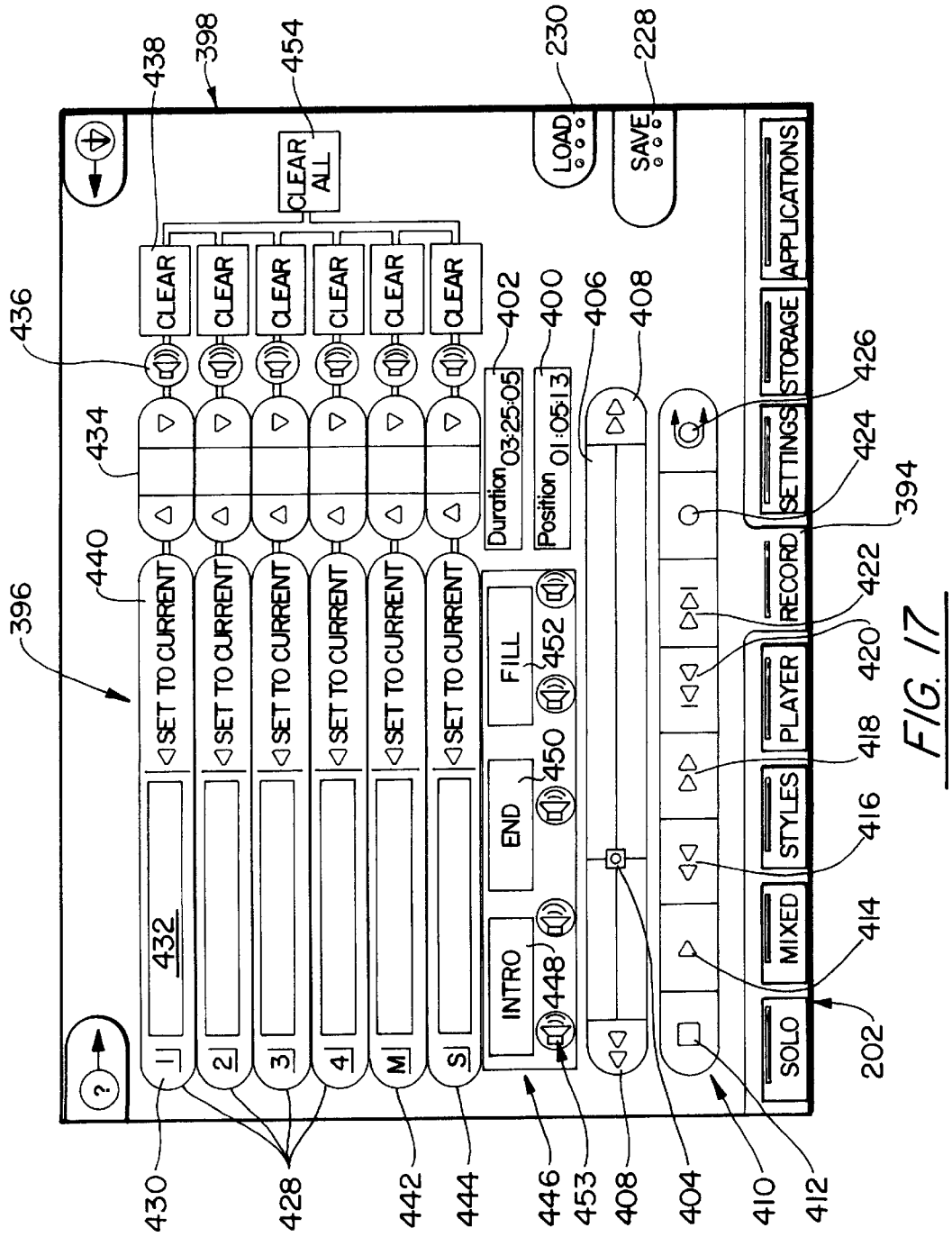
FIG. 17 is an exemplary graphical user interface control screen of the invention for multiple layer sequence recording.

Referring to FIG. 17, the access bar 202 of the system further preferably includes an activation button 394 for accessing a record screen 398 and can be labeled, for example RECORD. The sequencer provided by the record screen 398 is preferably easy to use, while still giving control over individual tracks. It is possible to record any instrument voice (mix or single) into a sequence.

A time frame 400 shows the current position in the piece. The user can place a current position marker 404 in a time bar 406 by clicking and dragging the marker 404 to the desired location. Additionally, arrow buttons 408 on either side of the time bar 406 can move the current position marker 404 by, for example, a 100th of a beat. The buttons on a control bar 410 include a stop 412, play/pause 414, start of song 416, next song 418, rewind 420, and fast forward 422. Additionally, there are two toggle buttons: a record toggle button 424 and a synchro-start button 426.

In operation, pressing play/pause 414 when the sequence is stopped causes the sequence to begin playing/recording (depending on the state of the record toggle button 424) at the current position 400 and the following buttons become disabled: start of song 416, rewind 420, and fast forward 422. Pressing play/pause 414 when the sequence is playing, pauses the sequence. Pressing stop 412 stops the sequence, restores the current position marker 404 to its original position before play was started and all currently disabled buttons are enabled. Pressing rewind 420/fast forward 422 moves the position marker 404 backward/forward at a relatively high speed until the beginning/end of the song is reached, or the button is released. Pressing the record button 424 will toggle the play button 414 function to either play or record over the currently selected track. Pressing the synchro-start button 426 will toggle synchro-start to either activated or not. If synchro-start 426 is activated, pressing any key or pedal is equivalent to pressing the play/pause button; the note played is audible and will be recorded if the record button 424 is on.

There can be a plurality, such as four, single instrument tracks 428. When a single instrument track 428 is marked for recording, the current single instrument sound selected on the single instrument selection screen 200 (FIG. 7) is heard and is recorded onto the track. Each track 428 preferably has the following attributes and controls (visual order is not required by this lists order): track number, track name, volume, set-to-current.

The track is simply numbered 1–4. When the user presses on, for example, track 430, that track is marked for recording. Recording can only happen on one track, so any other track marked for recording is cleared. There is preferably always at least one track marked for recording.

The track name area 432 shows the current track name, which can be changed by pressing on the name area 432. This preferably brings up an on-screen alpha-numeric keyboard (not shown) for entering the name.

A relative volume toggle 434 applies an overall volume adjustment for the track 428. A mute button 436 is a toggle that either mutes or sounds the track for playback or record. A muted track preferably cannot be recorded upon. A clear track button 438 clears the associated track.

A SET TO CURRENT button 440 changes all instruments on the track to the current single instrument. When recording, the user hears all tracks unless they have been muted.

The screen 398 preferably provides a mixed instrument track 442. The controls for the mix instrument track 442 are preferably identical to the single instrument track 428 in function, with the exception that the associated SET TO CURRENT instrument button 440 will change all instruments on the track to the current mixed instrument ensemble established in the previously discussed mixed instrument screen 234 (FIG. 8).

The screen 398 also provides a styles track 444. The controls for the styles track 444 are preferably the same as the single and mixed tracks 428, 442, except that the associated SET TO CURRENT instrument button 440 will change all styles on the track to the current style as established and discussed above with reference to FIG. 14. Activation of the styles track 444, preferably displays a style control graphic 446. The styles control graphic 446 includes an INTRO button 448. When this button is pressed, and the style is not currently playing, the intro for the current style will play starting at the next beat followed by the normal play for the style. An END button 450 is also provided. When the style is playing, the end for the current style will play. When a FILL button 452 is pressed, the fill for the current style will play starting at the next beat. The control graphic can also provide mute controls 453 for selectively muting the voices in the styles track 444.

Three other general controls are preferably available on the record screen 398. A CLEAR ALL button 454 clears all tracks in the sequence. The recorded piece selected can be saved, and a previously stored recording can be retrieved from an information source using the save and load buttons 228, 230.

Figure 18:
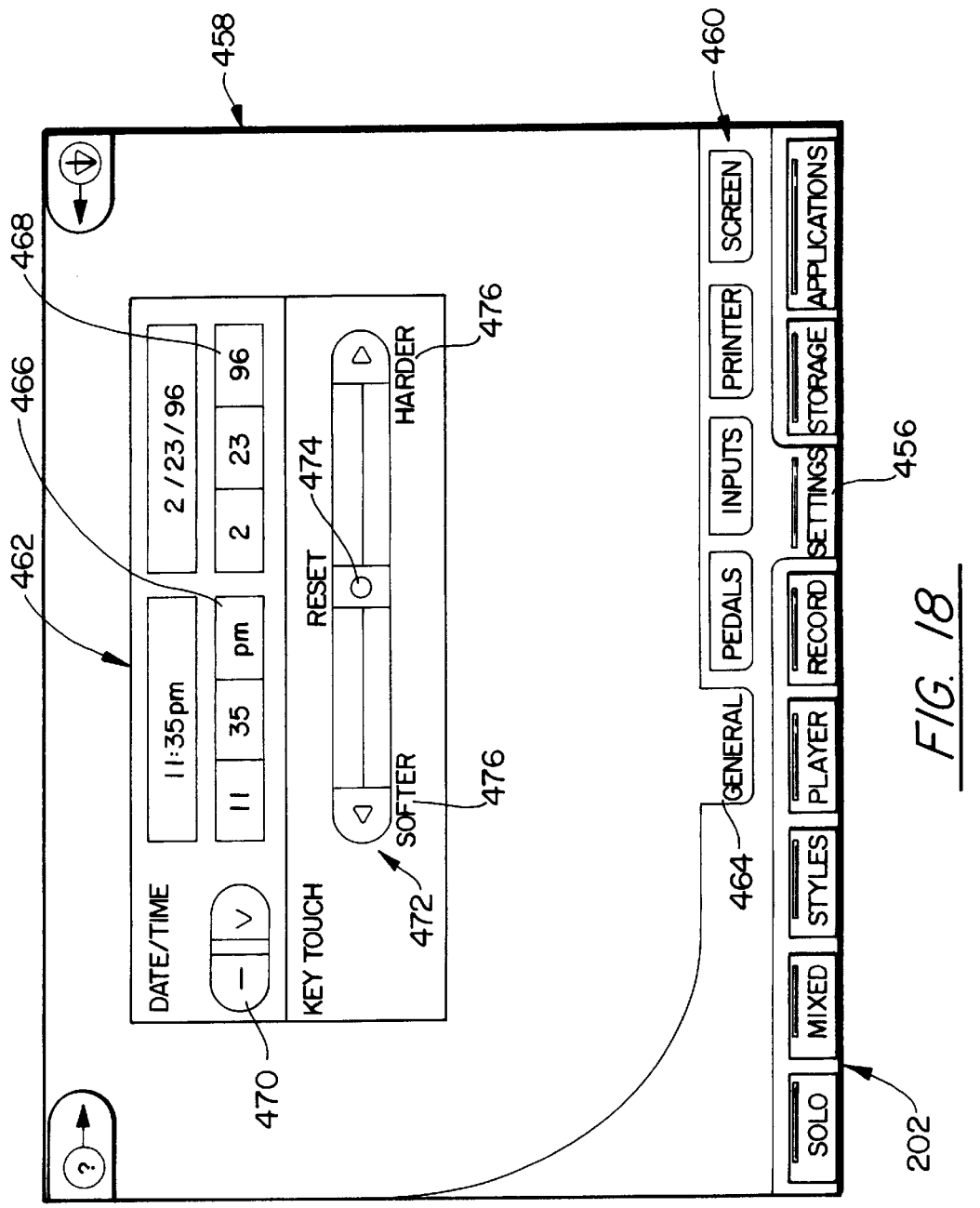
FIG. 18 is an exemplary graphical user interface control screen of the invention for setting clock and key sensitivity levels.

Referring to FIG. 18, the main access bar 202 for the system can include a SETTINGS button 456 for activating a settings screen 458 having a submenu bar 460. The settings screen 458 can include a frame 462 accessed through a GENERAL button 464 for adjusting date and time information in the system. To change, user touches either window for time 466 or for date 468, and touches arrows up/down keys 470 to move the selected number up or down.

The settings screen 458 can also present a key touch adjustment frame 472. A user may touch and slide indicator 474 and/or use HARDER or SOFTER buttons 476 to move indicator 474.

Figure 19:
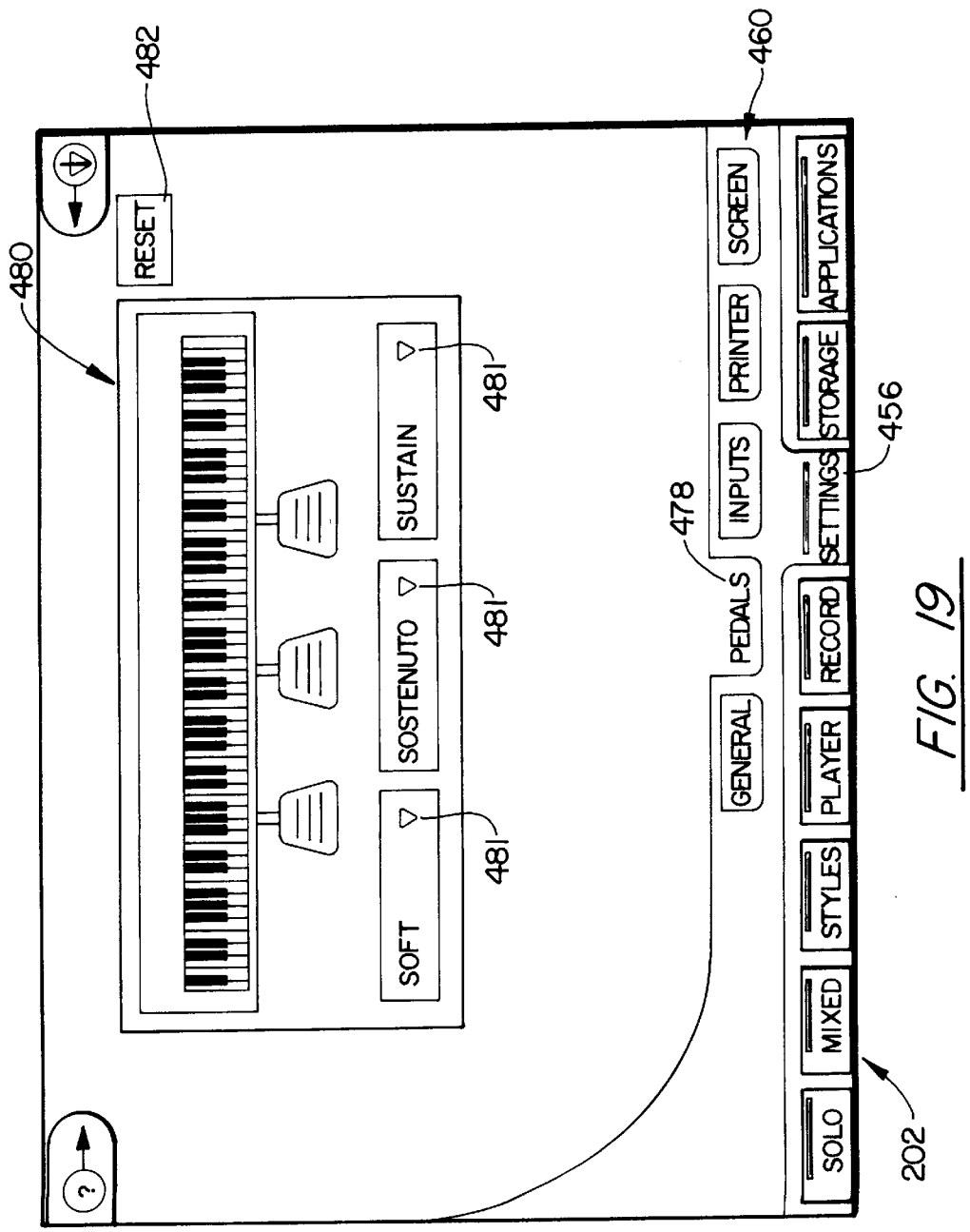
FIG. 19 is an exemplary graphical user interface control screen of the invention for foot pedal settings.

Referring to FIG. 19, the submenu bar 460 can have PEDALS button 478 for accessing a pedals control screen 480 to assign to each pedals a function of, for example, soft, sostenuto or sustain from a choice of functions on pop-up screens (not shown) for each control area 481. A RESET button 482 can be provided to restore the pedals to factory default settings.

Figure 20:
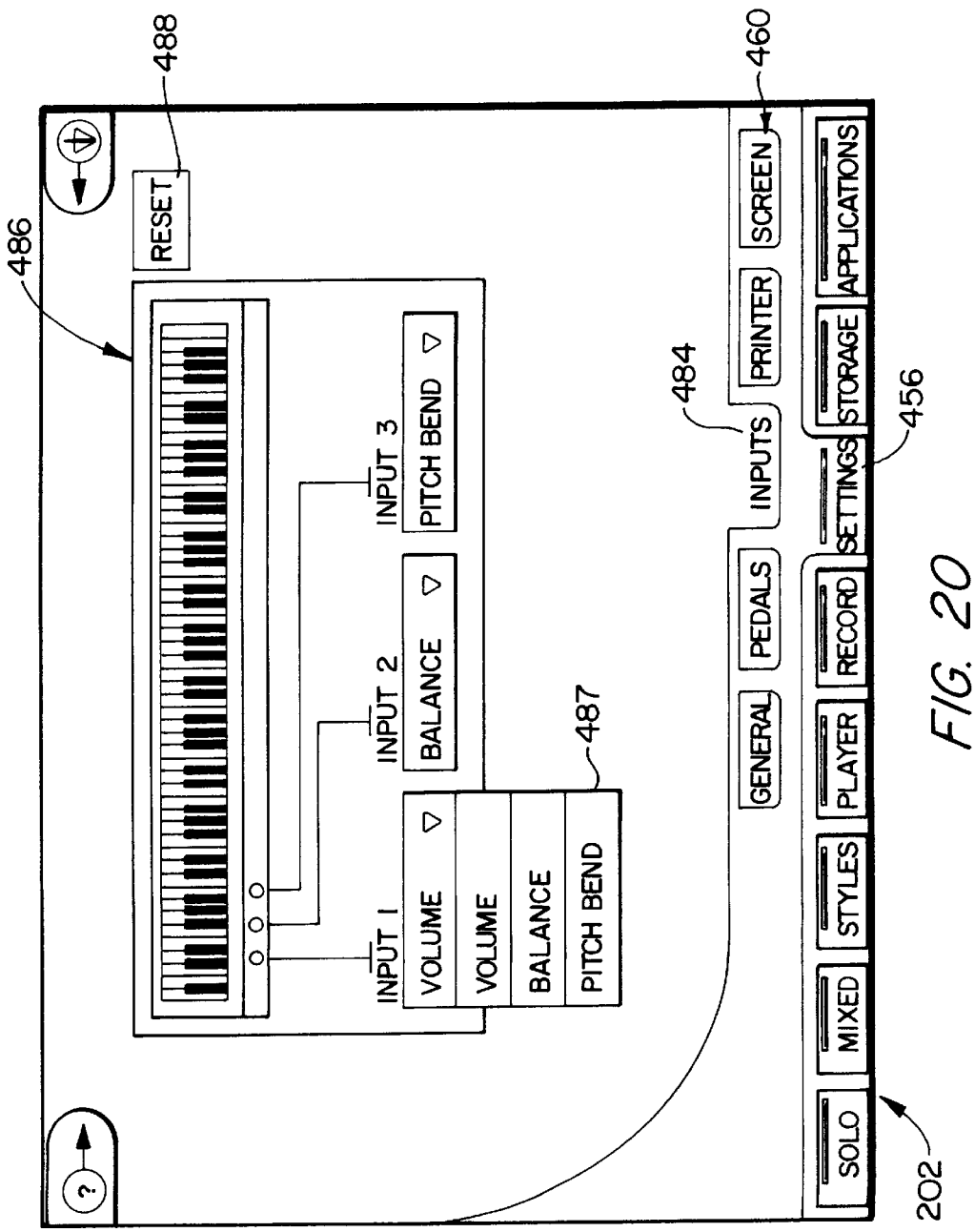
FIG. 20 is an exemplary graphical user interface control screen of the invention for input settings.

Referring to FIG. 20, the submenu bar 460 can have an INPUT button 484 for presenting an input settings screen 486 to identify MIDI input devices or accessories attached to the system, such as a volume pedal (not shown). A pop-up list of input devices can be provided by a control area 487 for each input port. A reset button 488 will restore the inputs to default settings.

Figure 21:
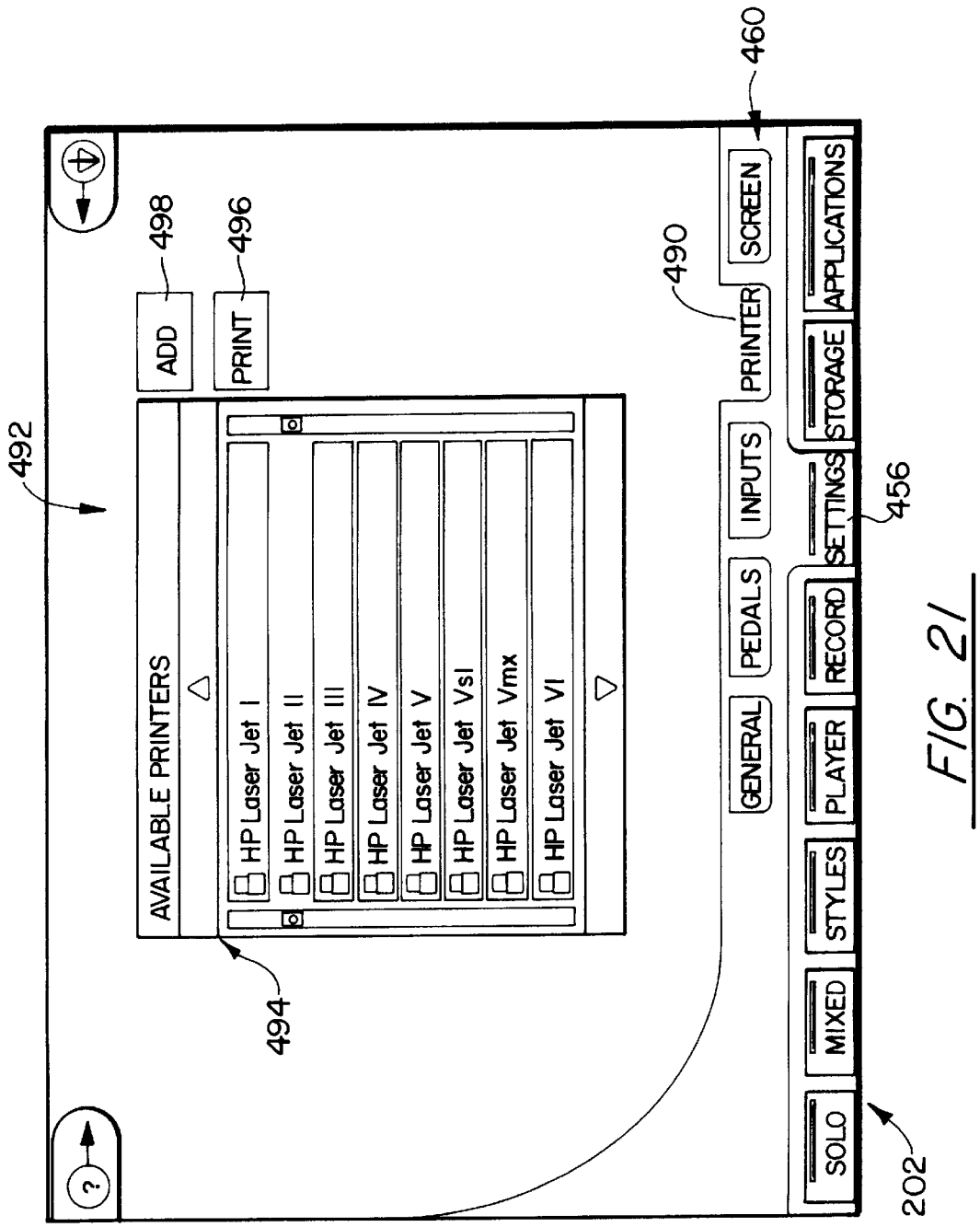
FIG. 21 is an exemplary graphical user interface control screen of the invention for printer selection.

Referring to FIG. 21, the submenu bar 460 can include a printer settings activation button 490 for presenting a printer settings screen 492. Available printers are preferably displayed in a selection list 494. Scroll bars can also be provided. A print button 496 can produce a printed test sheet. An ADD button 498 can bring up a further selection interface with Add, Done, and Cancel buttons (not shown).

Figure 22:
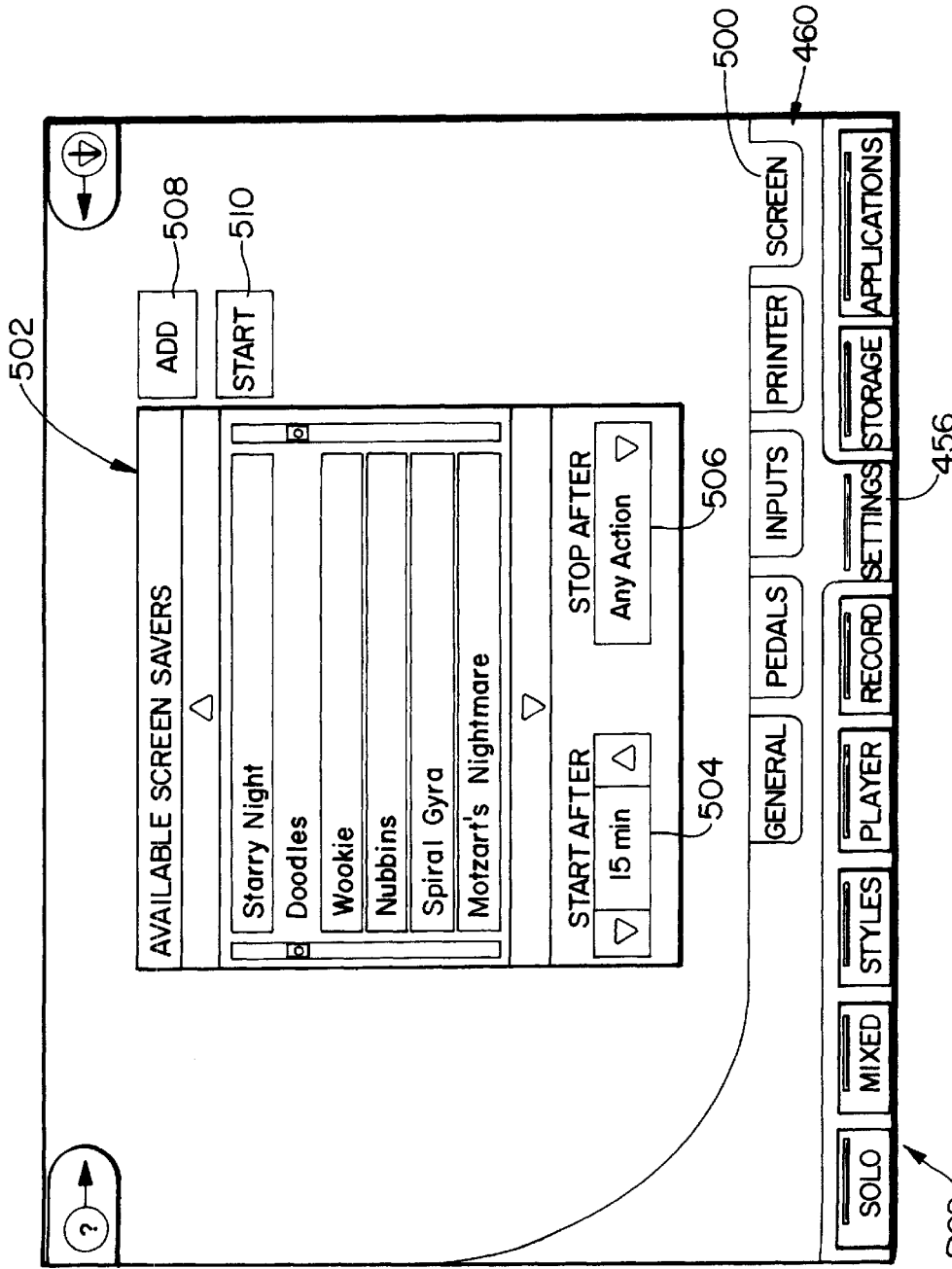
FIG. 22 is an exemplary graphical user interface control screen of the invention for screen saver settings.

Referring to FIG. 22, the submenu bar 460 can have a screen saver settings activation button 500. The associated control screen 502 allows the user to control screen savers. The START AFTER button 504 defines the period of inactivity before the screen saver is activated. STOP AFTER button 506 controls the method by which the interface is restored once the screen saver is activated. The ANY ACTION setting of button 506 will interrupt the screen saver when any input is sensed. ADD button 508 functions as the add function in the printer selection screen 492 as discussed above with reference to FIG. 21. A START button 510 can begin a demonstration of the screen saver selected.

Figure 23:
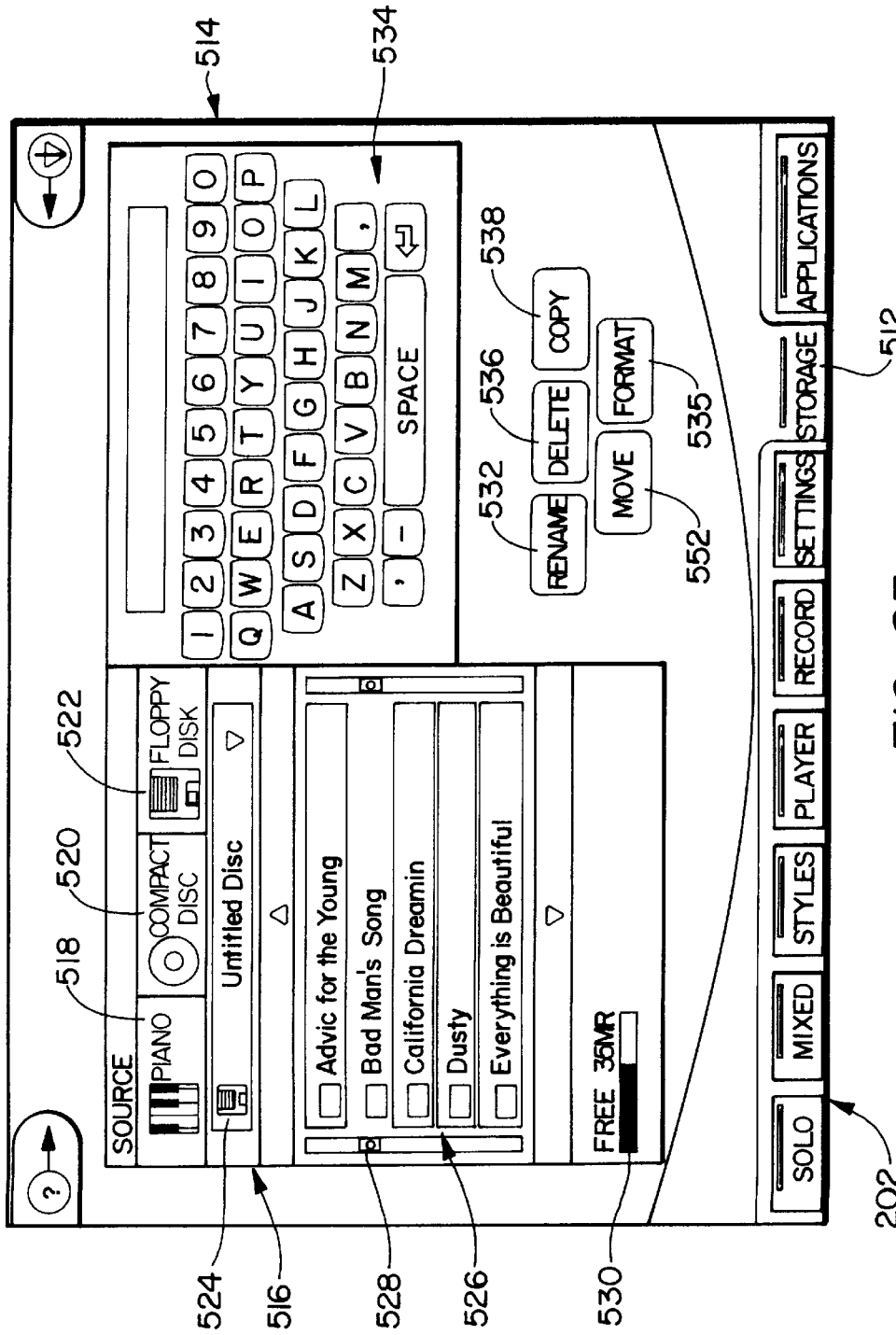
FIG. 23 is an exemplary graphical user interface control screen of the invention for file management functions.

Referring to FIG. 23, the access bar 202 preferably includes a button 512 such as STORAGE for accessing a storage control screen 514. The screen 514 can present a directory frame 516 that includes a plurality of source selection buttons for accessing the hard drive 518, compact disc 520 and floppy disks 522. The directory frame 516 preferably includes a title block 524 and a directory 526 of file'titles with a scroller 528 for moving through the list.

The control screen 514 preferably has a free space indicator 530 that displays the free space on either the hard drive or floppy drive depending upon the source selected.

To rename a file or directory, the user can select the source 518, 520 or 522 and select the file/directory 524 or 526 in which the file/directory highlights. The user then hits the RENAME button 532. The screen preferably includes an alpha-numeric keyboard graphic 534 for allowing user input of alphanumeric information in connection with renaming function. To delete a file or directory, the user can select the source 518, 520 or 522, and select the file/directory 524 or 526 in which the file directory highlights. The DELETE button 536 is then selected. Selection of the FORMAT button 535 executes a format program on an inserted floppy disk.

Figure 24:
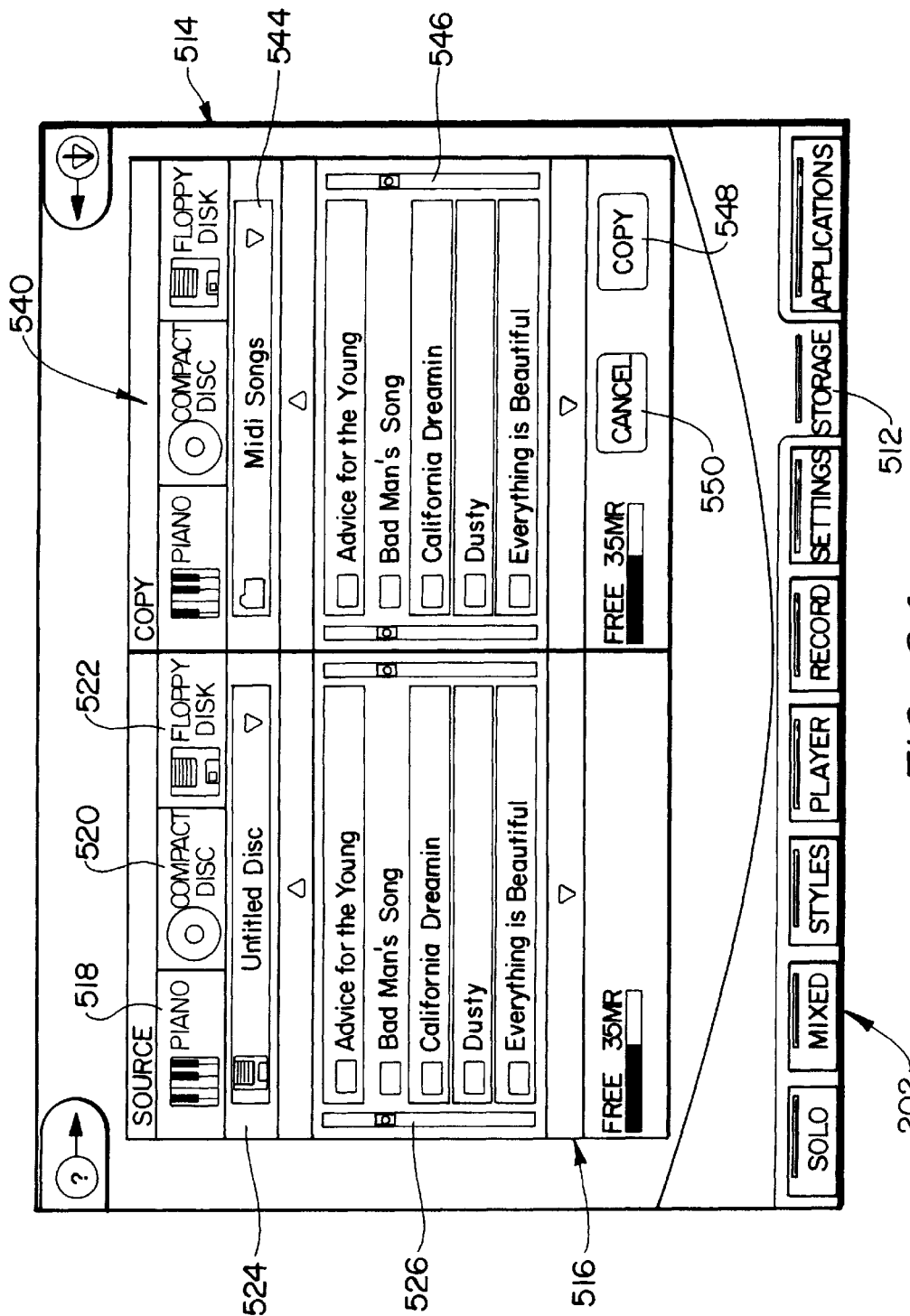
FIG. 24 is an exemplary graphical user interface control screen of the invention for copying files from one location to another.

To copy a file or directory to another destination, the user selects the source 518, 520 or 522 directory, and selects the file/directory 524 or 526. The user then hits the COPY button 538. Referring to FIG. 24, a second selection-type interface 540 preferably pops up to the right of the first frame 516. The user can then select the location for the file/directory 544 or 546 to be copied to and hit the COPY button 548 or cancels the copy by touching the CANCEL button 550. A similar screen can be provided for move function activated by the MOVE button 552 (FIG. 23).

Figure 25:
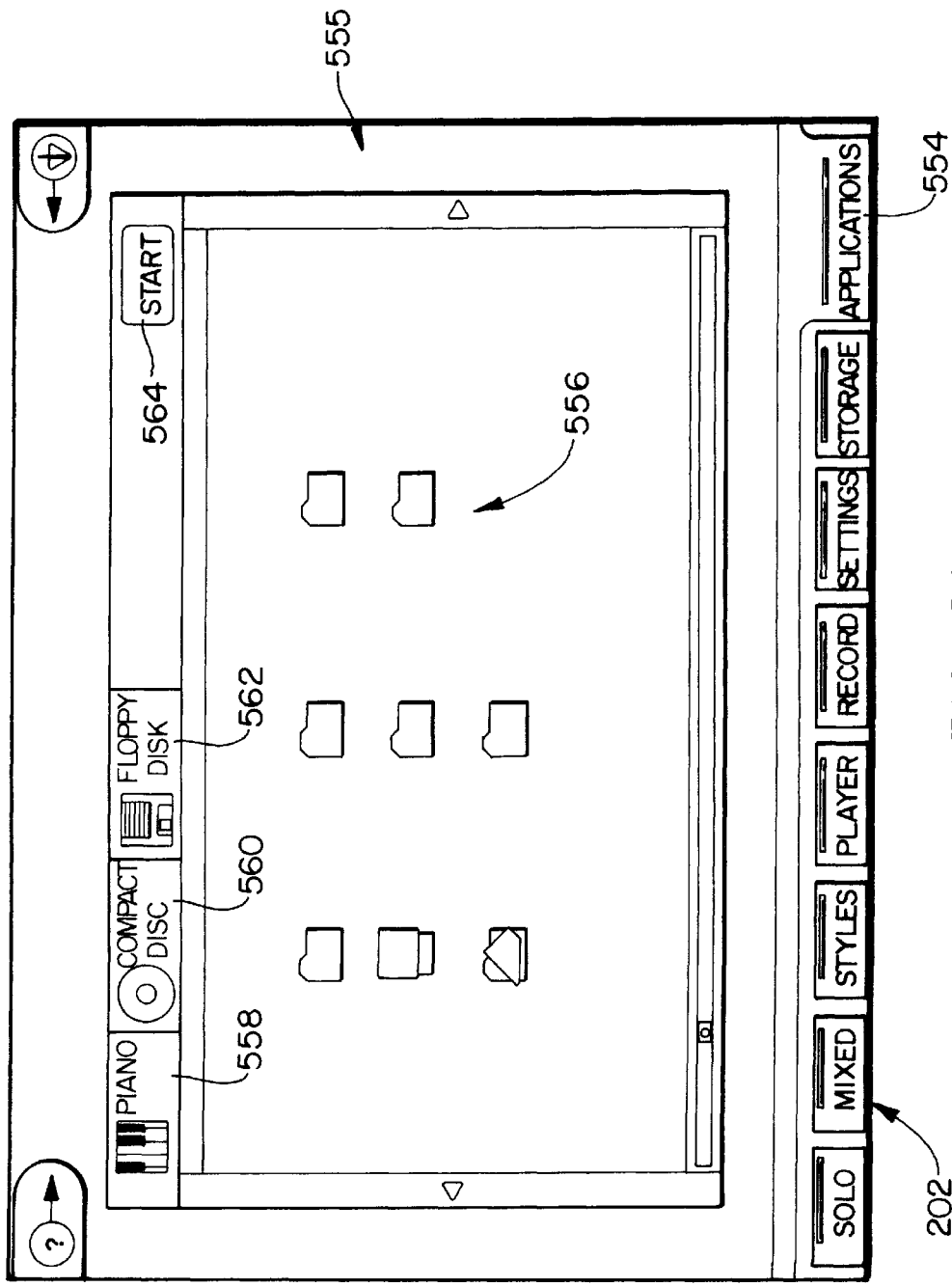
FIG. 25 is an exemplary graphical user interface control screen of the invention for running applications within the musical instrument system environment.

Referring to FIG. 25, the system access bar 202 can provide an APPLICATIONS button 554 to present a control screen 555 for starting other applications 556 that may be used in the musical instrument system environment. The source of applications can be selected with a hard drive selection button 558, CD selection button 560 or a floppy disk selection button 562.

To begin an application, the user can select one of the application icons 556, which preferably highlights, and click the START icon 564. The player shell application 189 (FIG. 6) is closed, and the selected application runs. Through this feature, the musical instrument system provides a music information environment in which newly developed applications can be readily loaded and can utilize an integrated musical keyboard and various music information sources through a readily accessible, consolidated graphical user interface.

Referring to FIG. 26, the SAVE button 228 presented in the various control screens (see FIGS. 7–24) can present a further control screen 590 providing a source selection graphic 592 including buttons for hard drive 594, compact disc 596 and floppy 598, as well as a directory or folder frame 600 listing the current folder and a pull down control for additional directories available as storing locations. New directories can be added by touching an activation button 602 labeled, for example, NEW FOLDER. A list of files 601 in the current folder 600 can be displayed, and the current file can be highlighted. The current file can be a file previously loaded, changed and now presented for re-saving. In this circumstance, the system preferably defaults the current file name in the identification area 603 for saving. The identification area 603 can provide a RENAME control, which can activate a further control area having an alpha-numeric keyboard graphic 604 for entering a new name. The name of the file is preferably displayed in a frame 606 above the alpha-numeric keyboard graphic 604. The new name in frame 606 can approved upon pressing the OK button 608 or can be canceled through a CANCEL button 610. Errors in the new name can also be corrected by a CLEAR button 607.

Upon entry of a new name, the name is changed (not shown) in the identification area 603. The file can then be saved by actuation of a SAVE button 609 or the process can be terminated with a CANCEL button 611.

For newly created recordings or ensemble settings or other information to be recorded for the first time, rather than modification of a retrieved file, the alphanumeric screen 604 preferably appears first for entry of the new file name 606. The save graphic 590 and the alphanumeric area 604 can appear simultaneously or separately on the display.

Referring to FIG. 27, previously stored settings or files can be retrieved through actuation of the LOAD button 230 present on the various control screens (see FIGS. 7–24). The LOAD button can activate a subscreen 612 displaying a source selection graphic 614 including hard drive 616, compact disc 618 and floppy disk drive 620 as well as a directory frame 622 listing the directory and a scrollable list of files. Once the desired file has been selected through contact and preferable highlight, the file can be loaded by touching the LOAD button 624 or the operation can be canceled through the CANCEL button 626.

The foregoing description is directed to various embodiments and preferences for using the features of the invention. Various alternatives not specifically discussed but within the scope of the invention may now be apparent to one having ordinary skill in the art. Accordingly, the scope of the invention should not be limited by the above discussion, but rather should be determined by a reasonable construction of the following claims.

We claim:

1. An electronic music instrument system, comprising:
   an electronic music instrument, having selectable groups of reproducible sounds and individually selectable reproducible sounds within said groups of sounds;
   an audio signal generator for energizing an audio amplifier responsive to different ones of a plurality of digital audio sources, including said groups of sounds and said individual sounds of said electronic music instrument;
   a graphical user interface for displaying at least one control graphic representing controllable parameters of said audio signals generated by said generator;
   control means responsive to operation of said control graphic for adjusting said controllable parameters of said generator and for selectively coupling different ones of said sources to said generator; and,
   information exchanging means for exchanging online music information between said electronic musical instrument and an on-line source of music information.

2. The system of claim 1, wherein said graphical user interface comprises:
   a video display; and,
   a touch-responsive overlay.

3. The system of claim 2, wherein one of said controllable parameters is voice selection for single instrument sound.

4. The system of claim 3, wherein one of said controllable parameters is key transposition for said single instrument sound.

5. The system of claim 4, wherein one of said controllable parameters is effects selection for said single instrument sound.

6. The system of claim 2, wherein:
   said controllable parameters include multiple instrument sound selection and sound layer assignment, controlled responsive to operation of said at least one control graphic; and,
   said at least one control graphic is displayed on a single screen of said graphical user interface.

7. The system of claim 6, wherein:
   said musical instrument comprises a musical keyboard; and, one of said controllable parameters is allocation of each said sound layer to keys on said musical keyboard, said allocation also being controlled responsive to operation of said at least one control graphic.

8. The system of claim 6, wherein:
   said musical instrument comprises a musical keyboard; and, operation of said at least one control graphic also enables key allocation responsive to said musical keyboard.

9. The system of claim 6, wherein:
   said graphical user interface generates a further control graphic;
   one of said controllable parameters is a volume control for each said sound layer, responsive to operation of said further control graphic; and,
   said further control graphic is displayed on a further single screen of said graphical user interface.

10. The system of claim 6, wherein:
   said graphical user interface generates a further control graphic;
   one of said controllable parameters is key transposition adjustment for each said sound layer, responsive to operation of said further control graphic; and, said further control graphic is displayed on a further single screen of said graphical user interface.

11. The system of claim 6, wherein:

said graphical user interface generates a further control graphic;

one of said controllable parameters is pan adjustment for each said sound layer, responsive to operation of said further control graphic; and, said further control graphic is displayed on a further single screen of said graphical user interface.

12. The system of claim 6, wherein:

said musical instrument comprises a musical keyboard; and, one of said controllable parameters includes allocation of keys on said keyboard to different sounds, responsive to operation of said at least one control graphic.

13. The system of claim 6, wherein:

said musical instrument comprises a musical keyboard; and, one of said controllable parameters includes assignment of said sound layers to ranges of said keys, responsive to operation of said at least one control graphic.

14. The system of claim 6, wherein said controllable parameters include drum syncopation, triggers, key change and volume, responsive to operation of said at least one control graphic.

15. The system of claim 6, wherein:

said graphical user interface displays a further control graphic;

said controllable parameters include multiple channel recording and allocation of different ones of said sound layers to different ones of said multiple channels, responsive to operation of said further control graphic; and, said further control graphic is displayed on a further single screen of said graphical user interface.

16. The system of claim 15, wherein said controllable parameters include allocation of drum syncopation to different ones of said multiple channels, responsive to operation of said further control graphic.

17. The system of claim 16, wherein said controllable parameters include same-channel recording and different-channel recording of said sound layers and said drum syncopation, responsive to operation of said further control graphic.

18. The system of claim 2, wherein:

said musical instrument comprises a musical keyboard;

said controlled parameters include drum voice selection and allocation to a key on said musical keyboard, responsive to operation of said at least one control graphic; and, said at least one control graphic is displayed on a single screen of said graphical user interface.

19. The system of claim 2, wherein:

said controllable parameters include drum syncopation, triggers, key change and volume, responsive to operation of said at least one control graphic; and, said at least one control graphic is displayed on a single screen of said graphical user interface.

20. The system of claim 1, wherein:

said musical instrument comprises a musical keyboard; and, said controllable parameters include audio characteristics of further sources, other than said sources originating in said musical keyboard of said musical instrument.

21. The system of claim 20, wherein said further sources comprise:

a hard disk drive;

a floppy disk drive; and, a compact disc drive.

22. The system of claim 1, wherein said information exchanging means comprises a modem for communicating with said on-line source of music information.

23. The system of claim 2, further comprising a piano housing, said system being mounted within said piano housing.

24. The system of claim 2, further comprising a piano housing, said video display being mounted in said piano housing.

25. The system of claim 2, further comprising a piano housing having a music stand formed integrally therewith, said video display being mounted in said music stand.

26. The system of claim 2, further comprising a piano housing having a music stand formed integrally therewith, said video display forming an integral part of said music stand.

27. The system of claim 1, wherein said control means is exclusively responsive to said graphical user interface.

28. The system of claim 2, wherein said electronic musical instrument comprises a musical keyboard.

29. The system of claim 28, wherein said control means is exclusively responsive to said graphical user interface and to said musical keyboard.

30. The system of claim 1, wherein said sources include at least one prerecorded source.

31. The system of claim 1, wherein said music information is provided to said audio signal generator as an audio source.

* * * * *

US006160213C1

(12) EX PARTE REEXAMINATION CERTIFICATE (7323rd)

United States Patent
Arnold et al.

(10) Number: US 6,160,213 C1
(45) Certificate Issued: Jan. 19, 2010

(54) ELECTRONIC MUSIC INSTRUMENT SYSTEM WITH MUSICAL KEYBOARD

(75) Inventors: Rob C. Arnold, Des Moines, IA (US); Warren W. Westlund, II, Ames, IA (US); David Van Koevering, Hermitage, TN (US); Robert D. Lawson, Des Moines, IA (US); Lance E. Lyda, Hurst, TX (US); Kenneth R. Noyce, West Des Moines, IA (US); Robert Phillips, Northbrook, IL (US); John M. Pursey, Des Moines, IA (US); Gary L. Snethen, Des Moines, IA (US)

(73) Assignee: Interactive Music Technology, LLC, Sheridan, WY (US)

Reexamination Request:
No. 90/009,172, Jun. 6, 2008

Reexamination Certificate for:
Patent No.: 6,160,213
Issued: Dec. 12, 2000
Appl. No.: 09/321,920
Filed: May 28, 1999

Related U.S. Application Data

(63) Continuation of application No. 08/879,678, filed on Jun. 23, 1997, now Pat. No. 5,908,997.
(60) Provisional application No. 60/021,522, filed on Jul. 11, 1996, and provisional application No. 60/020,601, filed on Jun. 24, 1996.

(51) Int. Cl.
G09B 15/02 (2006.01)
G09B 15/04 (2006.01)
G10G 7/00 (2006.01)
G10H 1/00 (2006.01)
G10H 7/00 (2006.01)

(52) U.S. Cl. ............................... 84/615; 84/615; 84/610; 84/634; 84/744 R; 84/477 R; 84/649; 84/650; 84/609; 84/626; 84/627; 84/628; 84/629; 84/630; 84/631; 84/632; 84/633; 84/662; 84/663; 84/664; 84/665; 84/666; 84/478

(58) Field of Classification Search ...................... None
See application file for complete search history.

(56) References Cited

U.S. PATENT DOCUMENTS

| 4,704,931 | A | 11/1987 | Nagai et al. ............... 84/600 |
| 5,559,301 | A | 9/1996 | Bryan, Jr. et al. ............ 84/653 |
| 5,563,359 | A | 10/1996 | Okamura ..................... 84/600 |

FOREIGN PATENT DOCUMENTS

| JP | A-62-186297 | 8/1987 |
| JP | 04-118686 | 4/1992 |
| JP | 06-004071 | 1/1994 |

OTHER PUBLICATIONS

Yamaha PortaTone PSR–6000 Owner's Manual.
"Big–Screen Entertainment: Yamaha Announces Their New Flagship, the PSR6000," Keyboard Review, pp. 19–20 (Nov. 1994).

(Continued)

*Primary Examiner*—Linh M. Nguyen

(57) ABSTRACT

An electronic music instrument system, comprising: an electronic music instrument, having selectable groups of reproducible sounds and individually selectable reproducible sounds; a signal generator for energizing an audio amplifier responsive to different digital audio sources, including the groups of sounds and the individual sounds a graphical user interface for displaying at least one control graphic representing controllable parameters of the audio signals generated by the generator; and, a controller responsive to operation of the control graphic for adjusting the controllable parameters of the generator and for selectively coupling different ones of the sources to the generator. The graphical user interface can comprise: a video display; and, a touch-responsive overlay. The controllable parameters can include multiple instrument sound selection and sound layer assignment, controlled responsive to operation of the at least one control graphic. The at least one control graphic can be displayed on a single screen.

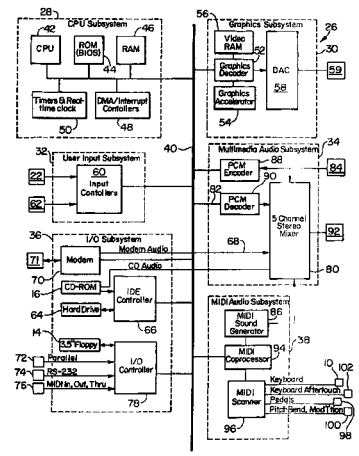

OTHER PUBLICATIONS

"Addictive: Ian Waugh Gets Hooked on the Playing Pleasures of the New Yamaha PSR–6000," Keyboard Player, pp. 32–35 (Nov. 1994).

Korg Trinity Music Workstation DRS Basic Guide (1995).

"Product News: New Korg Keyboards Offer User–Friendly Power," Music Trades, pp. 121–124 (Sep. 1995).

"The Holy Trinity? Korg Trinity Music Work Station," Sound on Sound, pp. 164–169 (Dec. 1995).

Yamaha MIDI Grand Brochure (1986).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–31 are cancelled.

\* \* \* \* \*